(12) United States Patent
Moon et al.

(10) Patent No.: US 10,355,488 B2
(45) Date of Patent: Jul. 16, 2019

(54) ENERGY STORAGE DEVICE, AND SERVER AND METHOD FOR CONTROLLING THE SAME

(71) Applicant: LG Electronics Inc., Seoul (KR)

(72) Inventors: Heesoo Moon, Seoul (KR); Jaehyuk Park, Seoul (KR); Sanghun Kim, Seoul (KR); Seungyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 15/274,760

(22) Filed: Sep. 23, 2016

(65) Prior Publication Data

US 2017/0012434 A1    Jan. 12, 2017

Related U.S. Application Data

(62) Division of application No. 13/837,584, filed on Mar. 15, 2013, now Pat. No. 9,478,990.

(30) Foreign Application Priority Data

Jun. 25, 2012  (KR) .................. 10-2012-0068058

(51) Int. Cl.
*H02J 13/00* (2006.01)
*H02J 3/32* (2006.01)
(Continued)

(52) U.S. Cl.
CPC ............... *H02J 3/383* (2013.01); *H02J 3/32* (2013.01); *H02J 3/40* (2013.01); *H02J 3/46* (2013.01);
(Continued)

(58) Field of Classification Search
None
See application file for complete search history.

(56) References Cited

U.S. PATENT DOCUMENTS

2010/0080306 A1*  4/2010  Fukuda .................. H04B 3/544
                                                                   375/257
2012/0146419 A1   6/2012  Shih
(Continued)

FOREIGN PATENT DOCUMENTS

CN   202218023 U   5/2012
GB     2483305 A   3/2012
(Continued)

*Primary Examiner* — Jared Fureman
*Assistant Examiner* — Aqeel H Bukhari
(74) *Attorney, Agent, or Firm* — Dentons US LLP

(57) ABSTRACT

Energy storage devices, servers, and methods for controlling the same are disclosed. The energy storage device can include at least one battery pack, a network interface configured to exchange data with a server, and a connector that receives alternating current (AC) power from an internal power network or outputs AC power to the internal power network. Energy storage device can also include a power converter configured to convert the AC power from the internal power network into direct current (DC) power based on the information about the power to store when information about power to store is received from the server, or, convert DC power stored in the battery pack into AC power based on the information about the power to output when information about power to output to the internal power network is received from the server. Accordingly, energy may be more efficiently stored.

14 Claims, 22 Drawing Sheets

(51) Int. Cl.
*H02J 3/38* (2006.01)
*H02J 3/46* (2006.01)
*H02J 7/00* (2006.01)
*H02J 3/40* (2006.01)
*H04W 84/12* (2009.01)
*H04W 4/80* (2018.01)

(52) U.S. Cl.
CPC ........ *H02J 7/0013* (2013.01); *H02J 13/0017* (2013.01); *H04W 4/80* (2018.02); *H04W 84/12* (2013.01); *Y02B 90/222* (2013.01); *Y02B 90/2607* (2013.01); *Y02D 70/00* (2018.01); *Y02D 70/142* (2018.01); *Y02D 70/144* (2018.01); *Y02D 70/162* (2018.01); *Y02D 70/166* (2018.01); *Y02E 10/563* (2013.01); *Y02E 10/566* (2013.01); *Y02E 40/72* (2013.01); *Y02E 40/76* (2013.01); *Y02E 60/722* (2013.01); *Y02E 70/30* (2013.01); *Y04S 10/123* (2013.01); *Y04S 10/14* (2013.01); *Y04S 10/545* (2013.01); *Y04S 20/12* (2013.01); *Y04S 40/12* (2013.01); *Y10T 307/696* (2015.04)

(56) References Cited

U.S. PATENT DOCUMENTS

| 2013/0271083 | A1  | 10/2013 | Williams |
|---|---|---|---|
| 2014/0062206 | A1* | 3/2014 | Bryson .................. H02J 3/385 |
|  |  |  | 307/80 |
| 2015/0073609 | A1* | 3/2015 | Forbes, Jr. ................ G05F 1/66 |
|  |  |  | 700/286 |

FOREIGN PATENT DOCUMENTS

| JP | 2007-060826 A | 3/2007 |
|---|---|---|
| JP | 2008-219979 A | 9/2008 |
| JP | 2010015955 A | 1/2010 |
| JP | 2011-100669 A | 5/2011 |
| JP | 2011119240 A | 6/2011 |
| JP | 2012-060835 A | 3/2012 |
| WO | 2011/115273 A1 | 9/2011 |
| WO | 2011/122374 A1 | 10/2011 |

* cited by examiner

ENERGY STORAGE DEVICE, AND SERVER AND METHOD FOR CONTROLLING THE SAME

CROSS-REFERENCE TO RELATED APPLICATIONS

This application is a Divisional Application of U.S. patent application Ser. No. 13/837,584 filed on Mar. 15, 2013, now allowed, which claims priority to Korean Patent Application No. 10-2012-0068058, filed on Jun. 25, 2012 in the Korean Intellectual Property Office, all of which are hereby incorporated by reference in their entirety.

BACKGROUND

Field

The present disclosure relates to energy storage devices, servers, and methods. More specifically, the present disclosure relates to energy storage devices, servers, and methods which are capable of efficiently storing and controlling energy.

Discussion of the Related Art

Fossil fuels, or non-renewable energy resources, such as petroleum and coal are depleting at an increasing rate. As a result, interest in alternative or renewable energy sources, including sunlight (i.e., solar power), wind, hydraulic, etc. is on the rise.

SUMMARY

Unfortunately, devices and systems for storing and methods of controlling energy generated from alternative energy sources have many shortcomings. For example, there is a lack of a device and control system that reliably supplies or stores energy made from renewable energy sources. Accordingly, an energy storage device which is capable of efficiently storing energy, a server, and a method for controlling the same is disclosed. Although the disclosed devices, servers, and methods are particularly well-suited for renewable energy sources, they may also be applied to non-renewable energy resources.

In an illustrative embodiment, an energy storage device is provisioned. The energy storage device can include at least one battery pack, a network interface that exchanges data with a server, and a connector that receives alternating current (AC) power from an internal power network or outputs AC power to the internal power network. In addition, energy storage device may include a power converter configured to convert the AC power from the internal power network into direct current (DC) power based on the information about the power to store when information about power to store is received from the server, or, convert DC power stored in the battery pack into AC power based on the information about the power to output when information about power to output to the internal power network is received from the server.

In some embodiments, a server is disclosed. Server can include a network interface that receives information about renewable power generated by a renewable energy generation device, information about commercial power supplied to an internal power network and information about load power consumed in the internal power network. In addition, server may include a processor configured to calculate power to store in at least one energy storage device through the internal power network or from the energy storage device to the internal power network based on at least one of the load power information, the commercial power information and the renewable power information. The network interface transmits information about the calculated power to store or information about the calculated power to output to the energy storage device.

In an embodiment, a method for controlling an energy storage device is disclosed. The method can include converting alternating current (AC) power from an internal power network into direct current (DC) power based on information about power to store when the information about the power to store is received from a server and storing the converted DC power. In addition, the method may include converting the stored DC power into AC power based on information about power to output to the internal power network when the information about the power to output is received from the server, and outputting the converted AC power to the internal power network.

A method for controlling a server is also disclosed. The method can include receiving information about renewable power generated by a renewable energy generation device and information about commercial power supplied to an internal power network and receiving information about load power consumed in the internal power network. In addition, the method may include calculating power to store in an energy storage device through the internal power network or power to output from the energy storage device to the internal power network based on at least one of the load power information, the commercial power information, and the renewable power information. The method may further comprise transmitting information about the calculated power to store or information about the calculated power to output to the energy storage device.

Advantages and features of the disclosure in part may become apparent in the description that follows and in part may become apparent to those having ordinary skill in the art upon examination of the following or may be learned from practice of the disclosure. The advantages and features of embodiments of the present disclosure may be realized and attained by the structures and processes described in the written description, the claims, and in the appended drawings.

It is to be understood that both the foregoing general description and the following detailed description are exemplary and explanatory and should not be construed as limiting the scope of the claims.

BRIEF DESCRIPTION OF THE DRAWINGS

The accompanying drawings are included to provide a further understanding of the disclosure, and are incorporated herein and constitute a part of this application. The drawings together with the description serve to explain exemplary embodiments of the present disclosure. Wherever possible, the same reference numbers will be used throughout the drawings to refer to the same or like parts. In the drawings.

DETAILED DESCRIPTION OF THE ILLUSTRATED EMBODIMENTS

Reference will now be made in detail to the specific embodiments of the present disclosure, examples of which are illustrated in the accompanying drawings. Wherever possible, the same reference numbers will be used throughout the drawings to refer to the same or like parts.

It should be noted that the suffixes of constituent elements used in the following description, such as "module" and "unit," are used for ease of writing this specification and do not have any particular importance or role. Accordingly, the terms "module" and "unit" may be used interchangeably.

Figure 1:
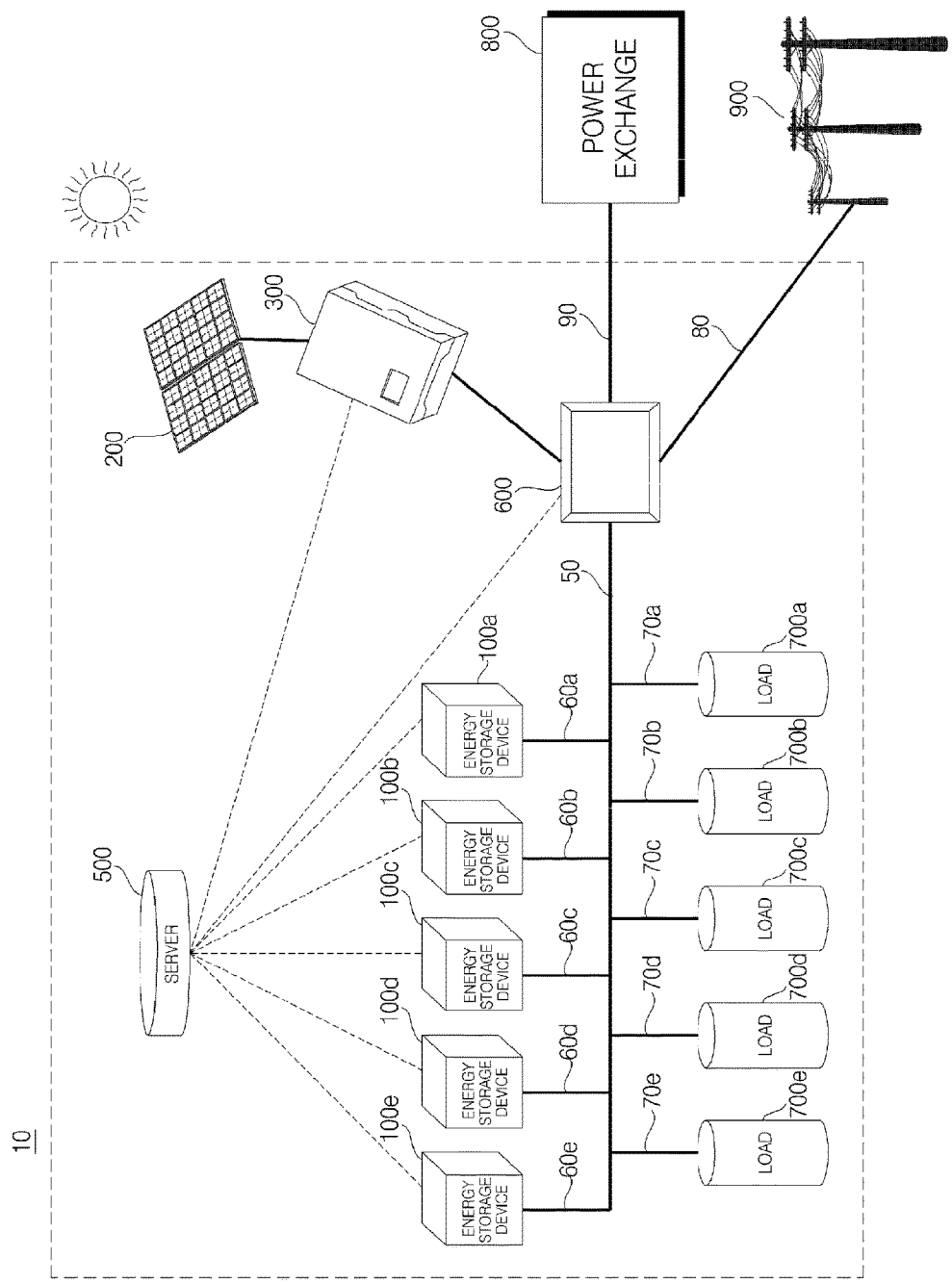
FIG. 1 illustrates a schematic view showing the configuration of a power supply system, according to an embodiment of the disclosure.

FIG. 1 illustrates a schematic view showing the configuration of a power supply system. Referring to FIG. 1, power supply system 10 supplies renewable power generated by a renewable energy generation device, commercial power from a commercial power plant 900, etc. to an internal power network 50 through a power distributor 600. Power supply system 10 may also supply some of the renewable power generated by the renewable energy generation device or some of power stored in an energy storage device to a power exchange 800 through the power distributor 600.

The renewable energy generation device in power supply system 10 may include a photovoltaic module for generating electricity using sunlight, a wind power module for generating electricity using wind power, and a heat power module for generating electricity using subterranean heat, etc. In an exemplary embodiment, renewable energy generation device can include a photovoltaic module 200 which is installable in each building.

Power supply system 10 may supply power into a building, but can be adapted to a variety of applications, settings, and extensions. For example, the power supply system 10 may supply power to each home in a collective building or may supply power to each of a plurality of buildings in a certain region. In some embodiments, power supply system 10 supplies power into a single building. The power supply system 10 of FIG. 1 may include internal power network 50, a plurality of energy storage devices 100a, 100b, . . . , 100e, the photovoltaic module 200, a junction box 300 to perform a power conversion function, a server 500, and power distributor 600.

As shown in FIG. 1, a plurality of loads 700a, 700b, . . . , 700e can be electrically connected to the internal power network 50 through respective connection terminals 70a, 70b, . . . , 70e that are connected to the internal power network 50. Energy storage devices 100a, 100b, . . . , 100e are illustrated as being electrically connected to the internal power network 50 through respective connection terminals 60a, 60b, . . . , 60e that are connected to the internal power network 50.

When the energy storage devices 100a, 100b, . . . , 100e operate in a charge mode, each of them may receive alternating current (AC) power from the internal power network 50, convert the received AC power into direct current (DC) power and store the converted DC power in a battery pack provided therein or attached thereto. Also, when the energy storage devices 100a, 100b, . . . , 100e operate in a discharge mode, each of them may convert DC power stored in the battery pack into AC power and supply the converted AC power to the internal power network 50.

The operation and internal configuration of each of the energy storage devices 100a, 100b, . . . , 100e will be described in further detail later with reference to FIGS. 4 to 10. Briefly, the charge mode and discharge mode of each of the energy storage devices 100a, 100b, . . . , 100e can be performed based on information about power to store or information about power to output to the internal power network 50, sent from the server 500.

Server 500 may perform wireless data communication with each of the energy storage devices 100a, 100b, . . . , 100e. In addition, server 500 may perform wireless data communication with the power distributor 600. Server 500 may also perform wireless data communication with the junction box 300, which is electrically connected to the photovoltaic module 200 to output AC power. In addition, the server 500 may perform wireless data communication with each of the loads 700a, 700b, . . . , 700e. In particular, server 500 may perform wireless data communication with powered-on ones of the energy storage devices 100a, 100b, . . . , 100e.

The server 500 may receive a pairing request signal from a powered-on energy storage device and transmit a pairing response signal including a radio channel allocation signal, etc. to the powered-on energy storage device in response to the received pairing request signal. Then, when pairing with the powered-on energy storage device is completed, the server 500 may perform wireless data communication with the powered-on energy storage device over an allocated radio channel.

Generally described, wireless data communication may be performed using any one of Bluetooth, Radio Frequency Identification (RFID), Infrared Data Association (IrDA), Ultra Wideband (UWB), ZigBee, Radio Frequency (RF) and WiFi schemes. Hereinafter, the server 500 will be described as performing wireless data communication with each of the energy storage devices 100a, 100b, . . . , 100e, each of the loads 700a, 700b, . . . , 700e, the power distributor 600 or the junction box 300 in the WiFi scheme.

In order to effectuate control of the charge mode and the discharge mode operations of each of the energy storage devices 100a, 100b, . . . , 100e, the server 500 may receive information about renewable power generated by the renewable energy generation device, information about commercial power supplied to the internal power network 50, and information about load power consumed in the internal power network 50. For example, the server 500 may receive information about renewable power generated by the photovoltaic module 200 from the junction box 300 or power distributor 600 through WiFi communication. In addition, server 500 may receive information about commercial power supplied to the internal power network 50 from the power distributor 600 through WiFi communication. Server 500 may also receive information about load power consumed by each of the loads 700a, 700b, . . . , 700e from a corresponding one of the loads 700a, 700b, . . . , 700e through WiFi communication. Server 500 may additionally receive information about power stored, storable or additionally storable in a battery pack of each of the energy storage devices 100a, 100b, . . . , 100e from a corresponding one of the energy storage devices 100a, 100b, . . . , 100e through WiFi communication.

In an embodiment, server 500 may determine that each of the energy storage devices 100a, 100b, . . . , 100e will operate in the charge mode, based on at least one of the renewable power information, the commercial power information, the load power information and the additionally storable power information, and calculate power to store in each of the energy storage devices 100a, 100b, . . . , 100e in the charge mode. Server 500 may also determine that each of the energy storage devices 100a, 100b, . . . , 100e will operate in the discharge mode, based on at least one of the renewable power information, the commercial power information, the load power information and the additionally storable power information, and calculate power to output from each of the energy storage devices 100a, 100b, . . . , 100e to the internal power network 50 in the discharge mode. In addition, server 500 may transmit information about the calculated power to store or information about the calculated power to output to each of the energy storage devices 100a, 100b, . . . , 100e through WiFi communication.

In some embodiments, server 500 may be a network server which provides a network in the power supply system 10 of FIG. 1, more particularly a wireless network server which is capable of performing wireless data communication, as stated above, namely, a wireless router. The server 500 may also be a network access server (NAS) which is accessible outside a network, besides inside the network. Accordingly, outside the network, the user may remotely access the server 500 using a mobile terminal such as a mobile phone to control the operation of the server 500. That is, the user may control the operation of the server 500, stated above.

Server 500 may perform data communication with the power exchange 800. For example, server 500 may receive information about the price of commercial power supplied from the power exchange 800, peak time power supply/demand information, etc. from the power exchange 800. Alternatively, the server 500 may receive the information about the price of the commercial power supplied from the power exchange 800, the peak time power supply/demand information, etc. through the power distributor 600.

Photovoltaic module 200 converts sunlight into DC power and outputs the converted DC power. Accordingly, the photovoltaic module 200 may include a solar cell module (not shown). The solar cell module may include a plurality of solar cells (not shown). In addition, the solar cell module may further include a first sealing member (not shown) disposed on the bottom of the solar cells, a second sealing member (not shown) disposed on the top of the solar cells, a rear substrate (not shown) disposed on the lower surface of the first sealing member, and a front substrate (not shown) disposed on the upper surface of the second sealing member. Each solar cell can be a semiconductor device which converts solar energy into electrical energy, and may be a silicon solar cell, a compound semiconductor solar cell, a tandem solar cell, a fuel sensitive solar cell, a CdTe solar cell or a CIGS solar cell. The solar cells may be electrically connected in series, in parallel or in series-parallel.

Junction box 300 receives DC power from the solar cell module, converts the received DC power into AC power and outputs the converted AC power. The junction box 300 may include a bypass diode (not shown), a DC/DC converter (not shown), a smoothing capacitor (not shown), and an inverter (not shown). In addition, junction box 300 may further include a wireless communication unit (not shown) for communication with the server 500. Of note, the junction box 300 may transmit information about generated solar power to the server 500. The junction box 300 may also receive solar power adjustment information from the server 500 and adjust solar power to output based on the received solar power adjustment information.

In FIG. 1, solar power output from the junction box 300 is illustrated as being supplied to the internal power network 50 via the power distributor 600. In this connection, the power distributor 600 may transmit the solar power information to the server 500. Although the junction box 300 is shown in FIG. 1 as being separate from the photovoltaic module 200, it may be attached on the rear surface of the photovoltaic module 200, alternatively.

Figure 2:
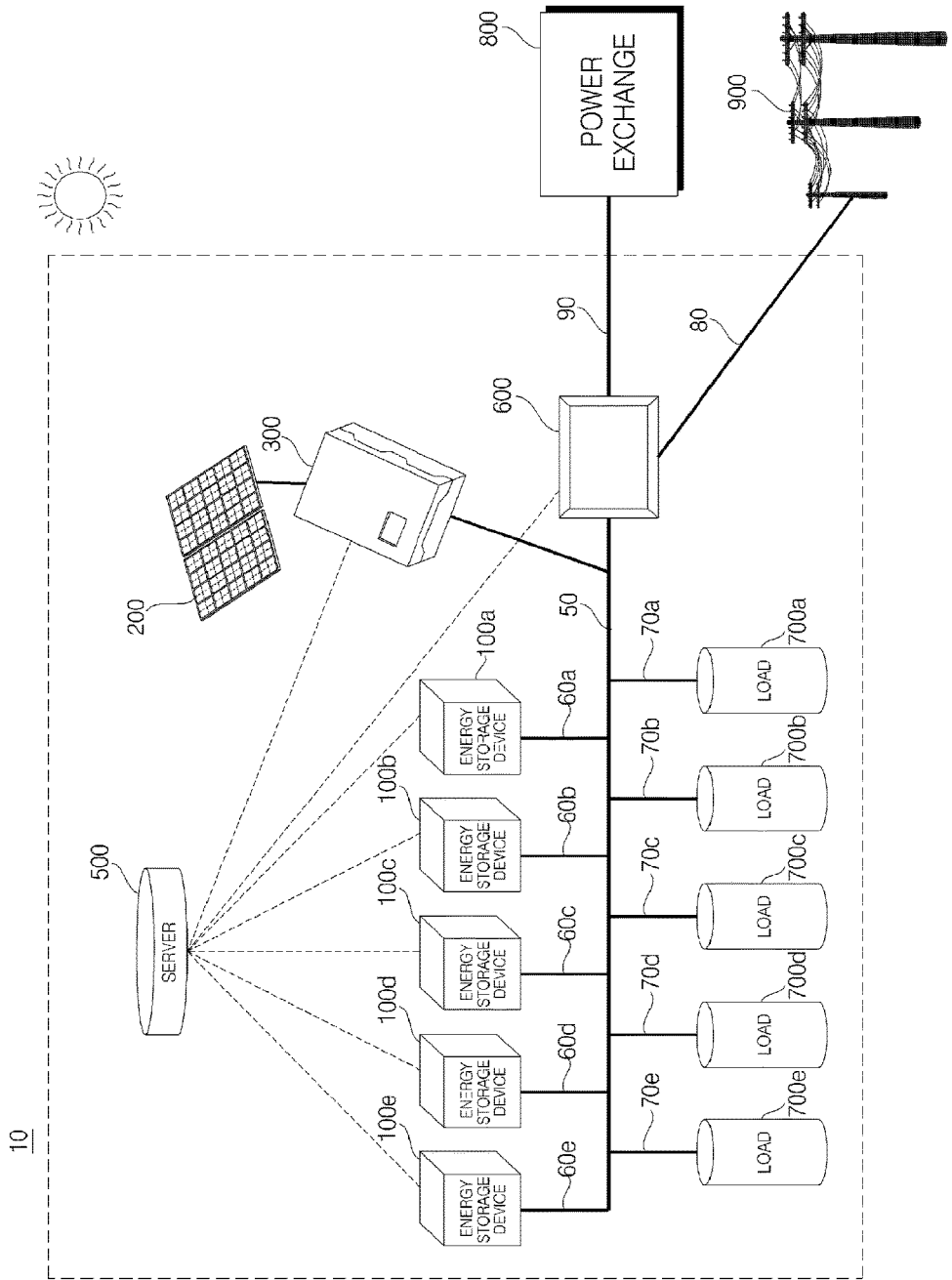
FIG. 2 illustrates a schematic view showing the configuration of a power supply system, according to an embodiment of the disclosure.

FIG. 2 depicts a schematic view showing the configuration of a power supply system. The power supply system 10 of FIG. 2 can be configured substantially the same as the power supply system 10 of FIG. 1, with the exception that the solar power output from the junction box 300 is directly supplied to the internal power network 50, not via the power distributor 600. Accordingly, it may be preferable that the solar power information be transmitted from the junction box 300, not the power distributor 600, to the server 500.

Figure 3:
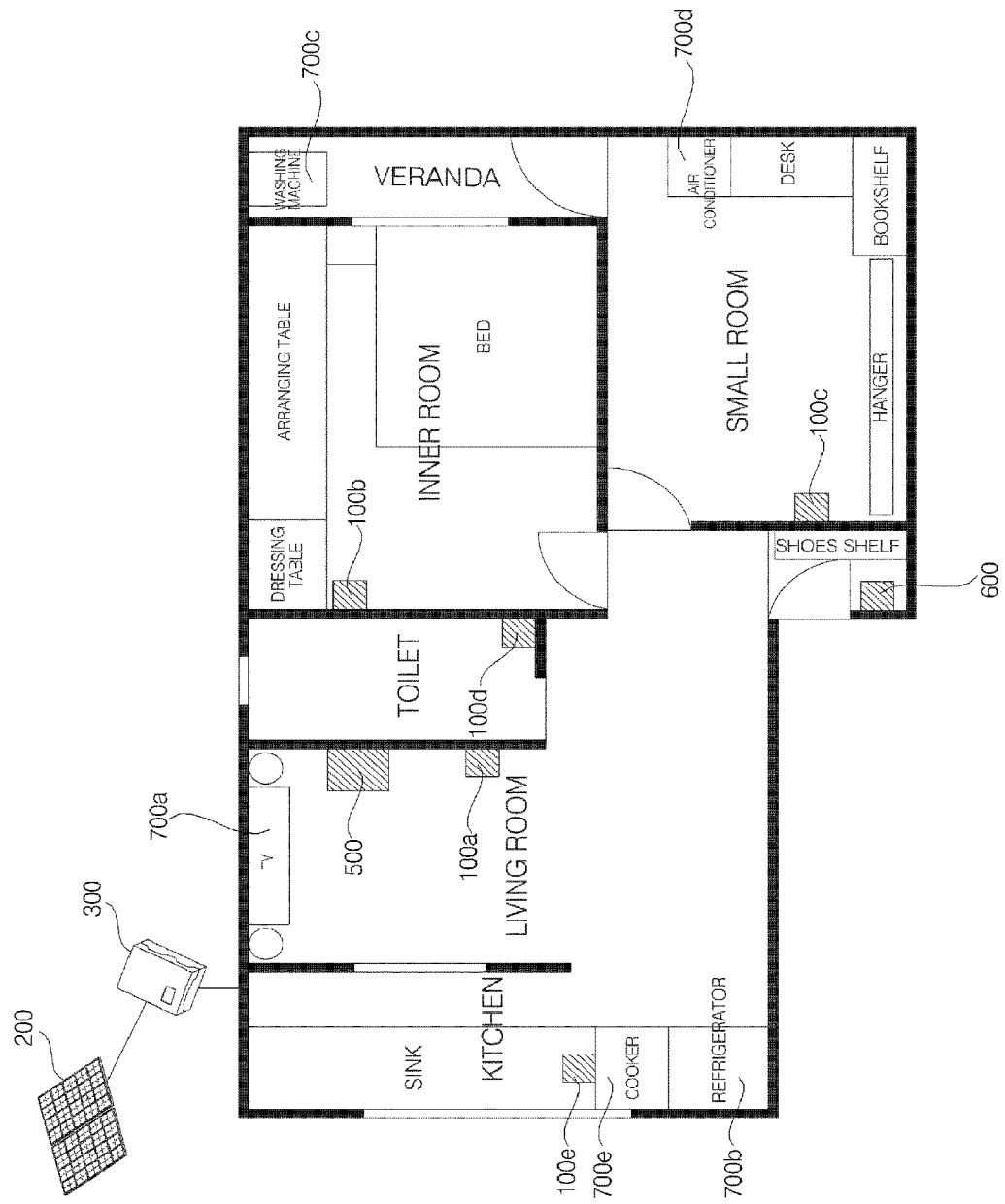
FIG. 3 illustrates a plan view showing an arrangement of respective devices in the power supply system of FIG. 1, according to an embodiment of the disclosure.

FIG. 3 illustrates a plan view showing an arrangement of respective devices in the power supply system of FIG. 1. Referring to FIG. 3, the server 500, among the respective devices in the power supply system 10, may be disposed in a living room. The first energy storage device 100a may also be disposed in the living room, the second energy storage device 100b in an inner room, the third energy storage device 100c in a small room, the fourth energy storage device 100d in a toilet, and the fifth energy storage device 100e in a kitchen, respectively. These energy storage devices 100a, 100b, . . . , 100e may be electrically connected to the internal power network 50 through the respective connection terminals 60a, 60b, . . . , 60e, as stated previously with reference to FIG. 1.

As shown, a television (TV), which is the first load 700a, may be disposed in the living room, a refrigerator, which is the second load 700b, in the kitchen, a washing machine, which is the third load 700c, in a veranda, an air conditioner, which is the fourth load 700d, in the small room, and a cooker, which is the fifth load 700e, in the kitchen, respectively. These loads 700a, 700b, . . . , 700e may be electrically connected to the internal power network 50 through the respective connection terminals 70a, 70b, . . . , 70e, as stated previously with reference to FIG. 1. In addition, the power distributor 600 may be disposed around the gate of an entrance, the photovoltaic module 200 may be disposed at the roof of a building, and the junction box 300 may be externally disposed in the vicinity of the power distributor 600.

Server 500, which can be disposed in the living room, may perform wireless data communication with each of the energy storage devices 100a, 100b, ..., 100e through WiFi communication. The server 500 may also perform wireless data communication with each of the loads 700a, 700b, ..., 700e through WiFi communication. In addition, server 500 may perform wireless data communication with the power distributor 600 or junction box 300 through WiFi communication.

Figure 4:
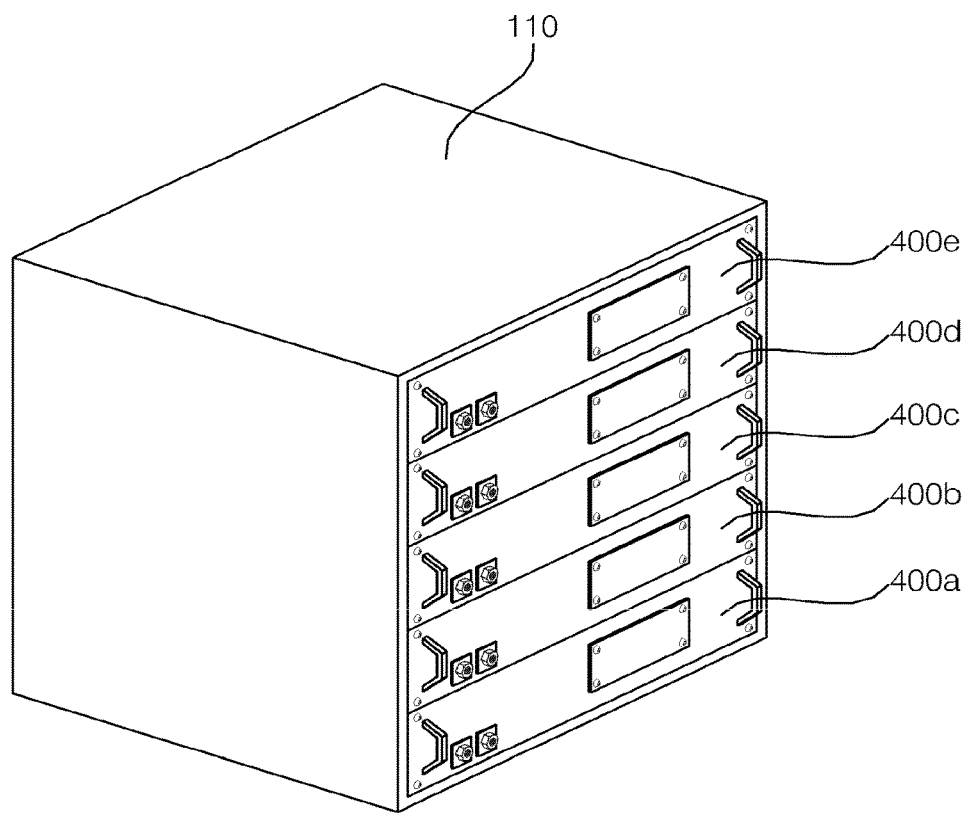
FIG. 4 illustrates a perspective view showing an embodiment of an energy storage device in FIG. 1, according to an embodiment of the disclosure.
Figure 5:
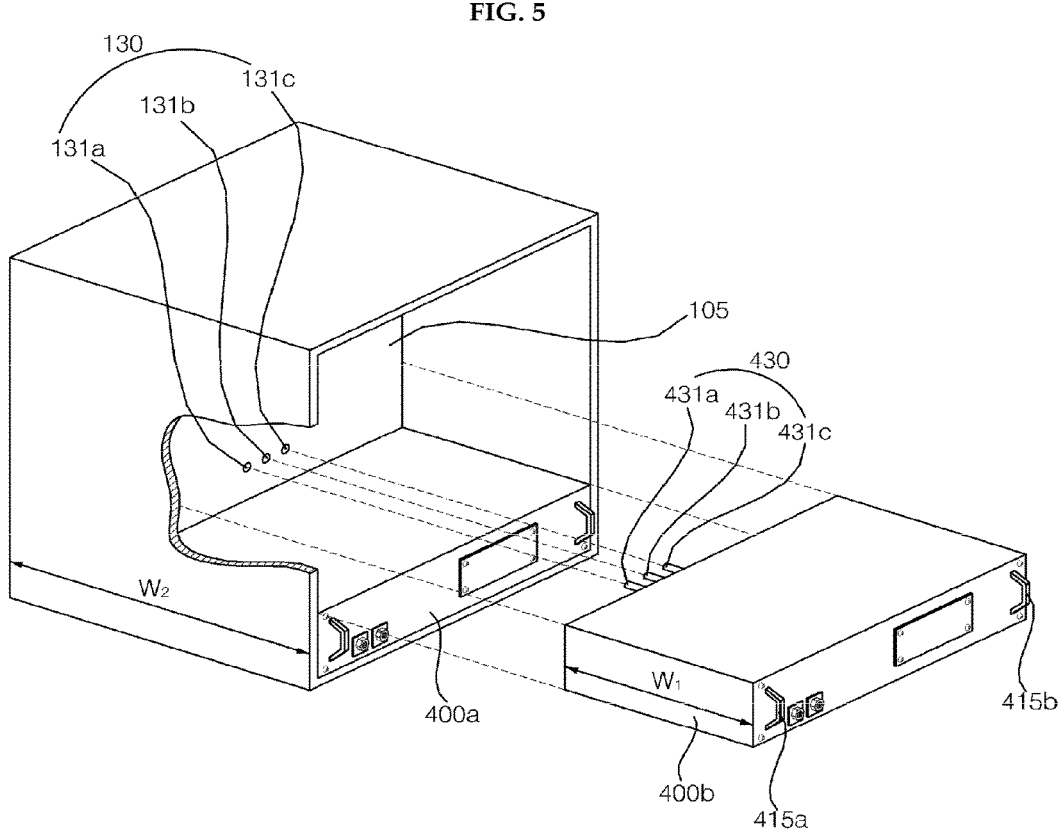
FIG. 5 illustrates a perspective view showing attachment of a battery pack to the energy storage device of FIG. 4, according to an embodiment of the disclosure.

FIG. 4 illustrates a perspective view showing an embodiment of an energy storage device in FIG. 1 and FIG. 5 is a perspective view showing attachment of a battery pack to the energy storage device of FIG. 4. Referring to FIGS. 4 and 5, the energy storage device 100 may include a case 110 having a hexahedral shape and opened at one side thereof, and a connector 130 coupled with connection terminals of each battery pack.

The case 110 may have a rectangular or cube-like integral structure, and include a hole formed at the side 105 of the energy storage device 100. As a result, a plurality of battery packs 400a, ..., 400e may be coupled with the energy storage device 100 at the side 105 thereof. The connector 130 may have a hinge structure such that it is coupled with connection terminals of each of the battery packs 400a, ..., 400e.

In FIG. 5, connector 130 is illustrated as including a positive power connection terminal 131a, a negative power connection terminal 131b, and a control signal connection terminal 131c hinged such that they are coupled with a positive power terminal 431a, negative power terminal 431b and control signal terminal 431c of the second battery pack 400b, respectively. It may be preferable that knobs be formed at the front side of each of the battery packs 400a, ..., 400e in order to readily attach or detach a corresponding one of the battery packs 400a, ..., 400e to or from the energy storage device 100. Knobs 415a and 415b can be formed in the second battery pack 400b.

The second battery pack 400b is illustrated as being attached on the first battery pack 400a under the condition that the first battery pack 400a is attached to the storage device 100 at the lowermost end of the energy storage device 100. When the user pushes the second battery pack 400b into the energy storage device 100 thereof with the knobs 415a and 415b of the second battery pack 400b held by him, the positive power terminal 431a, negative power terminal 431b and control signal terminal 431c of the second battery pack 400b can be coupled with the positive power connection terminal 131a, negative power connection terminal 131b and control signal connection terminal 131c of the energy storage device 100, respectively.

Although the five battery packs 400a, ..., 400e are illustrated in FIG. 4 as being capable of being coupled with the energy storage device 100 at the side 105 thereof, various numbers of be coupled with the energy storage device 100. In an embodiment, it may be preferable that the energy storage device 100 have a width W2 larger than the width W1 of the battery pack because it has the internal circuits of FIG. 8 or 9 arranged therein.

In addition, although the second battery pack 400b is illustrated in FIG. 5 as being attached just above the first battery pack 400a, it may, alternatively, be coupled with the energy storage device 100 apart from the first battery pack 400a under the condition that the first battery pack 400a is coupled with the energy storage device 100 at the lowermost end of the energy storage device 100. As a result, because an empty space is defined between the second battery pack 400b and the first battery pack 400a, a support member (not shown) may be coupled with the energy storage device 100 thereof to support the empty space. This support member can preferably be of the same size and shape as the battery pack(s). That is, the support member may have knob-shaped portions, and protrusions corresponding to the respective connection terminals. This support member may be coupled with the energy storage device 100 thereof instead of battery pack(s), not coupled.

Figure 6:
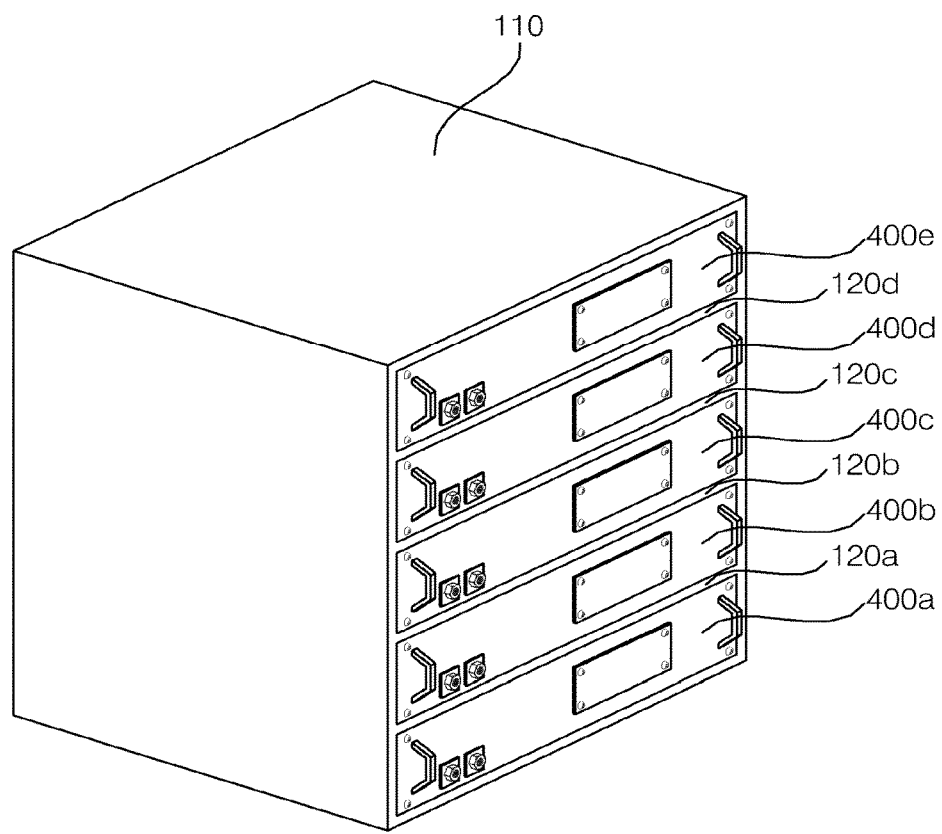
FIG. 6 illustrates a perspective view showing another embodiment of the energy storage device in FIG. 1, according to an embodiment of the disclosure.
Figure 7:
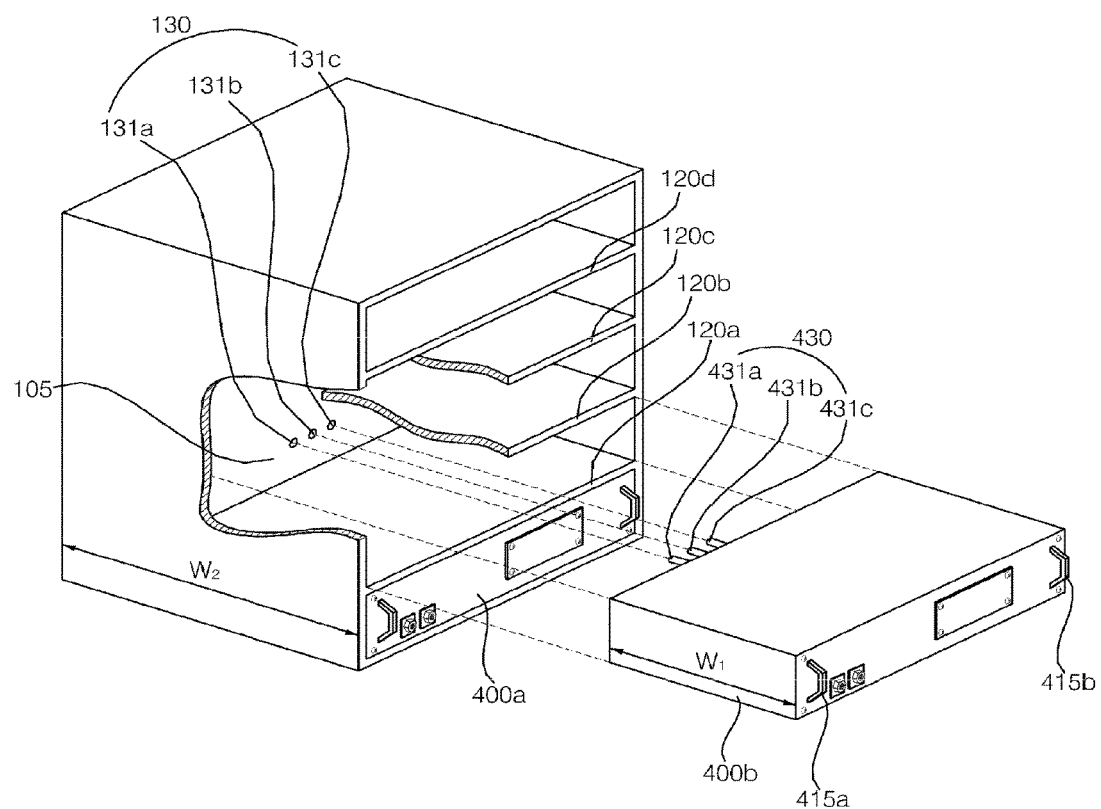
FIG. 7 illustrates a perspective view showing attachment of a battery pack to the energy storage device of FIG. 6, according to an embodiment of the disclosure.

FIG. 6 illustrates a perspective view showing another embodiment of the energy storage device in FIG. 1 and FIG. 7 illustrates a perspective view showing attachment of a battery pack to the energy storage device of FIG. 6. Referring to FIGS. 6 and 7, the outer appearance of the energy storage device of FIG. 6 can be substantially the same as that of the energy storage device of FIG. 4, with the exception that partitions 120a, 120b, 120c and 120d are arranged in the case 110 of the energy storage device of FIG. 6 to compartmentalize battery packs.

Partitions 120a, 120b, 120c and 120d may function to guide the respective battery packs 400a, ..., 400e such that the battery packs 400a, ..., 400e are attached to the energy storage device thereof. These partitions 120a, 120b, 120c and 120d may protect the respective battery packs 400a, ..., 400e attached to the energy storage device 100.

Figure 8:
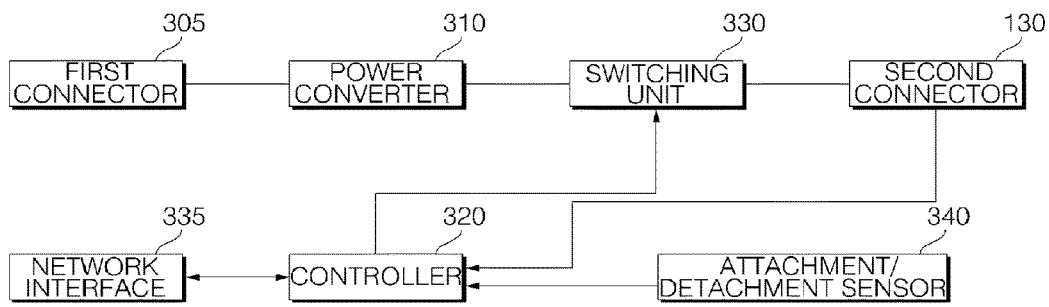
FIG. 8 illustrates a block diagram of the energy storage device in FIG. 1, according to an embodiment of the disclosure.
Figure 9:
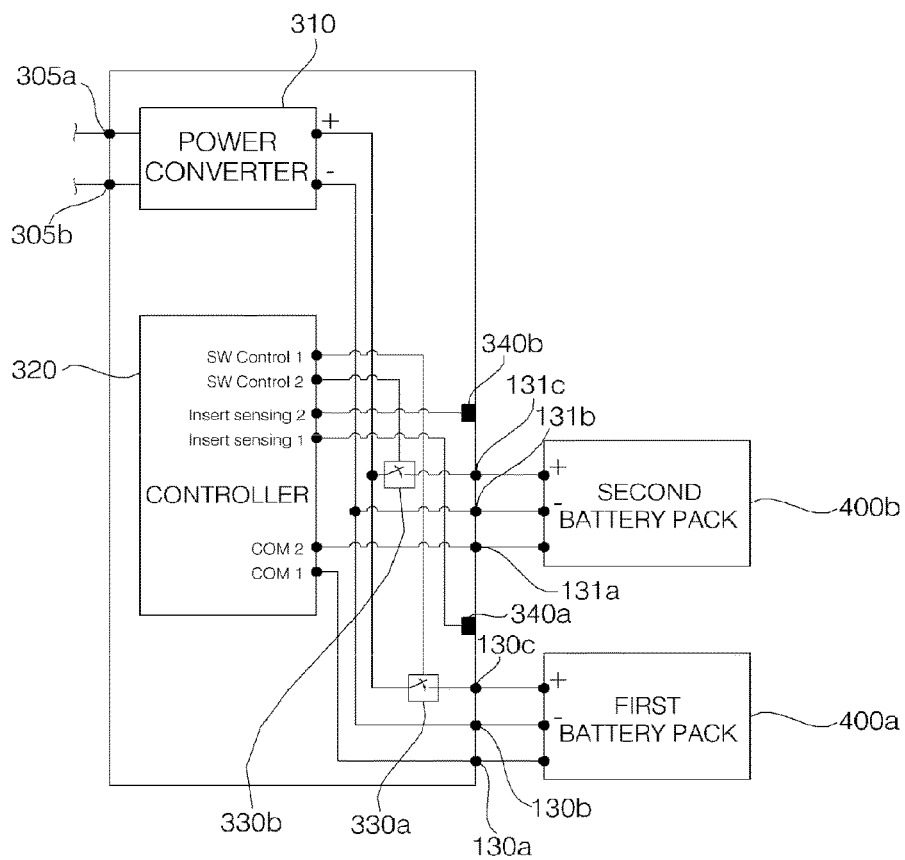
FIG. 9 illustrates a schematic circuit diagram of the energy storage device of FIG. 8, according to an embodiment of the disclosure.

FIG. 8 illustrates a block diagram of the energy storage device in FIG. 1, and FIG. 9 illustrates a schematic circuit diagram of the energy storage device of FIG. 8. Referring to FIGS. 8 and 9, the energy storage device 100 may include a first connector 305, a power converter 310, a controller 320, a switching unit 330, a network interface 335, an attachment/detachment sensor 340, a second connector 130, and a detachable battery pack 400.

First connector 305 may include only AC power terminals 305a and 305b. In some embodiments, energy storage device 100 receives AC power from the internal power network 50 and outputs AC power to the internal power network 50. Accordingly, DC power terminals may not be needed, and only the AC power terminals 305a and 305b can be provided.

In the power supply system of FIG. 1, the AC power terminals 305a and 305b may receive AC power from the internal power network 50 or output AC power converted by the energy storage device 100 to the internal power network 50. Power converter 310 may convert AC power input through the first connector 305 into DC power. Then, the converted DC power may be transferred to the battery pack 400 via the switching unit 330 and the second connector 130.

Alternatively, power converter 310 may convert DC power stored in the battery pack 400 into AC power. Then, the converted AC power may be transferred to the above-stated internal power network 50 via the first connector 305. Accordingly, the power converter 310 may include a bidirectional DC/AC converter.

Switching unit 330 can be disposed between the power converter 310 and the second connector 130 to perform a switching operation. As a result, the switching unit 330 may supply DC power from the power converter 310 to the second connector 130 or supply DC power from the second connector 130 to the power converter 310.

Detachable battery pack 400 may include the plurality of battery packs 400a to 400e as stated previously, and the switching unit 330 may include switches of a number corresponding to the number of the battery packs 400a to

400e. Although the switching unit 330 is illustrated in FIG. 9 as including a first switch 330a corresponding to the first battery pack 400a, and a second switch 330b corresponding to the second battery pack 400b, it may further include third to fifth switches 330c, 330d and 330e corresponding respectively to the third to fifth battery packs 400c, 400d and 400e.

Network interface 335 performs data communication with the server 500. For example, when the energy storage device 100 is powered on, the network interface 335 may transmit a pairing request signal to the server 500. Then, the network interface 335 may receive a pairing response signal including information about a radio channel allocated by the server 500 from the server 500.

After pairing is completed, network interface 335 may receive information about power to store or information about power to output to the internal power network 50 from the server 500. In addition, after pairing is completed, the network interface 335 may transmit information about power storable in the battery pack 400 to the server 500.

Attachment/detachment sensor 340 senses attachment or detachment of the battery pack 400. The attachment/detachment sensor 340 may include attachment/detachment sensing means 340a, 340b, . . . of a number corresponding to the number of the detachable battery packs 400a, 400b, . . . . Each of the attachment/detachment sensing means 340a, 340b, . . . may detect a voltage between a corresponding one of positive power connection terminals 130a, 131a, . . . and a corresponding one of negative power connection terminals 130b, 131b, . . . . A resistor may be used for the voltage detection.

When each of the battery packs 400a, 400b, . . . is attached, a potential difference between a corresponding one of the positive power connection terminals 130a, 131a, . . . and a corresponding one of the negative power connection terminals 130b, 131b, . . . corresponds to DC power stored in a corresponding one of the battery packs 400a, 400b, . . . . Each of the attachment/detachment sensing means 340a, 340b, . . . senses whether a corresponding one of the battery packs 400a, 400b, . . . has been attached or detached, by detecting the above potential difference.

For example, when the first battery pack 400a is attached, the potential difference between the first positive power connection terminal 130a and the first negative power connection terminal 130b may correspond to DC power stored in the first battery pack 400a. The first attachment/detachment sensing means 340a detects the potential difference, and may sense that the first battery pack 400a has been attached, when the detected potential difference is higher than or equal to a predetermined level.

For another example, when the first battery pack 400a is detached, the potential difference between the first positive power connection terminal 130a and the first negative power connection terminal 131a may correspond to 0V. The first attachment/detachment sensing means 340a detects the potential difference, and may sense that the first battery pack 400a has been detached, when the detected potential difference is lower than the predetermined level.

Alternatively, each of the attachment/detachment sensing means 340a, 340b, . . . may detect current flowing between a corresponding one of the positive power connection terminals 130a, 131a, . . . and a corresponding one of the negative power connection terminals 130b, 131b, . . . , . On the other hand, a current sensor, a current transformer (CT) or a shunt resistor may be used for the current detection.

For example, when the first battery pack 400a is attached, a closed loop may be formed between the first positive power connection terminal 130a and the first negative power connection terminal 130b, and current may flow through the closed loop. The first attachment/detachment sensing means 340a detects the current, and may sense that the first battery pack 400a has been attached, when the level of the detected current is higher than or equal to a predetermined level.

For another example, when the first battery pack 400a is detached, an open loop may be formed between the first positive power connection terminal 130a and the first negative power connection terminal 130b, and thus no current may flow. That is, this current may correspond to 0 A. The first attachment/detachment sensing means 340a detects the current, and may sense that the first battery pack 400a has been detached, when the level of the detected current is lower than the predetermined level.

The voltage or current detected by each of the attachment/detachment sensing means 340a, 340b, . . . may be transferred to the controller 320. Although not shown, the energy storage device 100 may further include an AC power detector (not shown) for detecting AC power supplied from the first connector 305. For example, the AC power detector (not shown) may detect a voltage or current between the AC power terminals 305a and 305b of the first connector 305. The detected voltage or current may be transferred to the controller 320.

Controller 320 controls the entire operation of the energy storage device 100. In detail, the controller 320 may control the energy storage device 100 to convert external input AC power into DC power and store the converted DC power in the battery pack 400 or convert DC power stored in the battery pack 400 into AC power and output the converted AC power externally. That is, the controller 320 may control the energy storage device 100 such that the battery pack 400 operates in the charge mode or discharge mode. This charge mode operation or discharge mode operation may be performed based on information about power to store or information about power to output to the internal power network 50, received from the server 500, as stated previously.

For example, when the information about the power to store is received, the controller 320 may control the energy storage device 100 such that AC power corresponding to the power to store is input through the first connector 305 and then converted into DC power by the power converter 310. Then, the controller 320 may control the energy storage device 100 to store the converted DC power in the battery pack 400. That is, the controller 320 may control the energy storage device 100 such that it operates in the charge mode. At this time, the controller 320 may turn on a corresponding switch of the switching unit 330. Accordingly, the power corresponding to the information about the power to store may be stored in the battery pack 400.

For another example, when the information about the power to output to the internal power network 50 is received, the controller 320 may control the energy storage device 100 such that DC power stored in the battery pack 400 corresponding to the power to output is supplied to the power converter 310. Then, the controller 320 may control the energy storage device 100 such that the supplied DC power is converted into AC power by the power converter 310. That is, the controller 320 may control the energy storage device 100 such that it operates in the discharge mode. At this time, the controller 320 may turn on a corresponding switch of the switching unit 330. Accordingly, the DC power stored in the battery pack 400 may be converted and then supplied to the internal power network 50.

When a plurality of battery packs are attached to the energy storage device 100, the controller 320 may receive the levels of DC powers stored respectively in the battery packs and control the energy storage device 100 based on the received power levels such that power balancing is performed between the battery packs. For example, in the case where the first battery pack 400a and the second battery pack 400b are attached to the energy storage device 100, the controller 320 may receive respective detected DC power levels of the first battery pack 400a and second battery pack 400b. Then, the controller 320 may compare the detected DC power levels with each other and control the energy storage device 100 based on a result of the comparison to operate any one of the first battery pack 400a and second battery pack 400b in the charge mode and the other one in the discharge mode such that power balancing is performed between the first battery pack 400a and the second battery pack 400b.

For example, when the DC power level of the first battery pack 400a is higher than the DC power level of the second battery pack 400b, the controller 320 may control the energy storage device 100 to operate the first battery pack 400a in the discharge mode and the second battery pack 400b in the charge mode such that the same DC powers are stored in the respective battery packs 400a and 400b. In detail, the controller 320 may change connections of the first and second switches in the switching unit 330.

The controller 320 may receive a signal indicating whether the battery pack 400 has been attached or detached from the attachment/detachment sensor 340. When the battery pack 400 is attached, the controller 320 may immediately control the operation of the switching unit 330 to turn off a corresponding switch of the switching unit 330. For example, when the battery pack 400 is attached to the energy storage device 100, inrush current may be suddenly generated in the energy storage device 100, thereby damaging circuit elements in the energy storage device 100. In order to overcome this problem, when the battery pack 400 is attached to the energy storage device 100, the controller 320 may advantageously control the operation of the switching unit 330 such that a corresponding switch of the switching unit 330 is kept off for a first off period.

The first off period may be longer when the number of battery packs attached is larger. That is, when the number of battery packs attached is larger, the peak level of inrush current may be higher. To overcome this surge of inrush current, it may be preferable that the off period of a corresponding switch of the switching unit 330 be controlled to be longer. Next, after the first off period, the battery pack 400 may operate in the charge mode or discharge mode under the control of the controller 320. That is, a corresponding switch of the switching unit 330 may be turned on.

In an embodiment, when the battery pack 400 is detached from the energy storage device 100, inrush current may be suddenly generated in the energy storage device 100, thereby damaging circuit elements in the energy storage device 100. In order to prevent a spike of inrush current, the controller 320 may control the operation of the switching unit 330 such that a corresponding switch of the switching unit 330 is kept off for a second off period when the battery pack 400 is detached from the energy storage device 100.

The second off period may be longer when the number of battery packs attached is larger. That is, when the number of battery packs attached is larger, the peak level of inrush current may be higher. To prevent this, it can be preferable that the off period of a corresponding switch of the switching unit 330 be controlled to be longer. Accordingly, the controller 320 may control the operation of a switch of the bidirectional DC/AC converter in the power converter 310.

In addition, when the second battery pack 400b is attached under the condition that the first battery pack 400a operates in the charge mode, the controller 320 may turn off both the switches 330a and 330b of the switching unit 330 for the first off period and then control the energy storage device 100 such that the second battery pack 400b, not the first battery pack 400a, operates in the charge mode. After the first off period, the first switch 330a may be kept off and the second switch 330b may be turned on. Accordingly, the battery packs may be controlled to be evenly charged.

Figure 10:
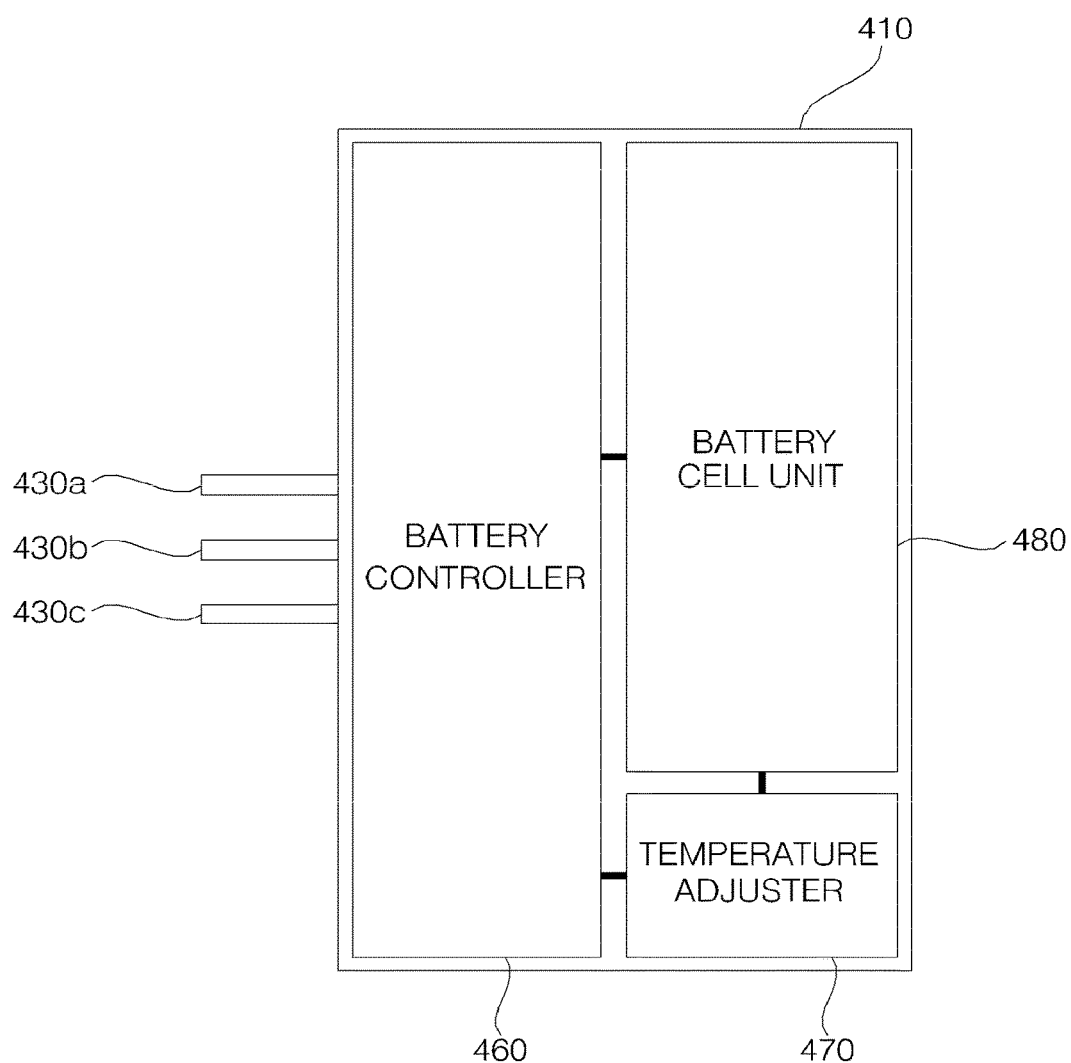
FIG. 10 illustrates an internal block diagram of a battery pack in FIG. 8, according to an embodiment of the disclosure.

FIG. 10 depicts an internal block diagram of the battery pack in FIG. 8. Referring to FIG. 10, the battery pack 400 includes a battery pack case 410, and a connector 430, a battery controller 460, a battery cell unit 480, and a temperature adjuster 470 provided in the battery pack case 410.

Connector 430 may have protruded connection terminals to be attached to the second connector 130 of the energy storage device 100. In detail, the connector 430 may have connection terminals such as the positive power terminal 431a, negative power terminal 431b and control signal terminal 431c. These terminals 431a, 431b and 431c are coupled with the hinged connection terminals 131a, 131b and 131c of the energy storage device 100, respectively, when the battery pack 400 is attached.

The battery cell unit 480 includes a plurality of battery cells. These battery cells may be connected in series, in parallel or in series-parallel combination. Although not shown, the battery cell unit 480 may be electrically connected to the positive power terminal 431a and the negative power terminal 431b.

The temperature adjuster 470 adjusts the temperature of the battery cell unit 480. Temperature adjuster 470 may include temperature sensing means (not shown) to sense the temperature of the battery cell unit 480. In addition, the temperature adjuster 470 may further include fan driving means (not shown) to drive a fan based on the sensed temperature so as to lower the temperature of the battery cell unit 480. In order to improve efficiency of the temperature adjustment, the fan driving means can be preferably disposed in an area corresponding to an area in which all the battery cells are arranged.

Battery controller 460 performs the overall control of the battery pack 400. For example, when the temperature of the battery cell unit 480 rises over a predetermined temperature, the battery controller 460 may control the temperature adjuster 470 to lower the temperature of the battery cell unit 480. In addition, the battery controller 460 may balance DC powers stored respectively in the battery cells in the battery cell unit 480. That is, the battery controller 460 may detect the DC powers stored respectively in the battery cells and balance the DC power stored in each of the battery cells based on a result of the detection.

When the battery pack 400 is attached to the connector 130 of the energy storage device 100, the battery controller 460 may transfer status information (a temperature, the level of power stored, etc.) of the battery pack 400 to the energy storage device 100 through the control signal terminal 431c. This status information may be input to the controller 320 of the energy storage device 100. The battery controller 460 may receive status information (the level of power needed, etc.) of the energy storage device 100 through the control signal terminal 431c.

Figure 11:
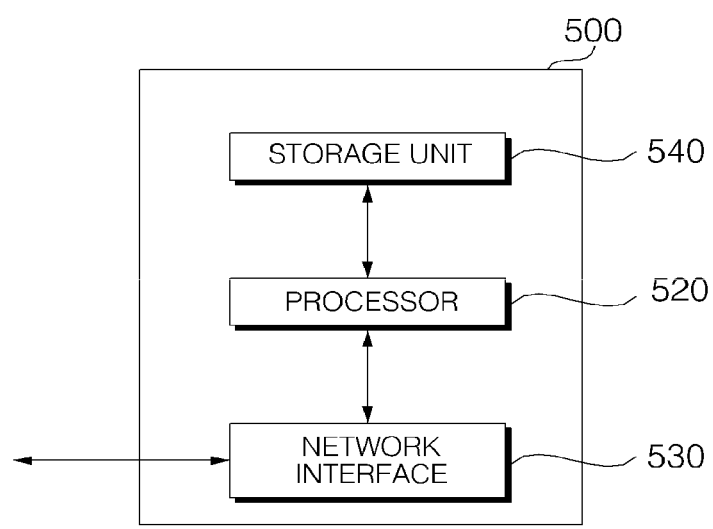
FIG. 11 illustrates an internal block diagram of a server in FIG. 1, according to an embodiment of the disclosure.

FIG. 11 illustrates an internal block diagram of the server in FIG. 1. Referring to FIG. 11, server 500 may be a network server, and include a network interface 530, a storage unit 540, and a processor 520. The server 500 may wirelessly exchange data with respective devices in the power supply system, and, particularly, control the plurality of energy storage devices 100a, 100b, . . . , 100e such that they operate in the charge mode or discharge mode.

Network interface 530 may receive a pairing request signal from a powered-on one of the energy storage devices 100a, 100b, 100e and transmit a pairing response signal generated by the processor 520 to the powered-on energy storage device in response to the received pairing request signal. The pairing response signal may include a radio channel allocation signal. For control of the charge mode and discharge mode operations of each of the energy storage devices 100a, 100b, . . . , 100e, the network interface 530 may receive information about renewable power generated by the renewable energy generation device, information about commercial power supplied to the internal power network 50, and information about load power consumed in the internal power network 50.

For example, the network interface 530 may receive information about renewable power generated by the photovoltaic module 200 from the junction box 300 or power distributor 600 through WiFi communication. In addition, the network interface 530 may receive information about commercial power supplied to the internal power network 50 from the power distributor 600 through WiFi communication. Network interface 530 may also receive information about load power consumed by each of the loads 700a, 700b, . . . , 700e from a corresponding one of the loads 700a, 700b, . . . , 700e through WiFi communication. The network interface 530 may receive information about power stored, storable or additionally storable in the battery pack of each of the energy storage devices 100a, 100b, . . . , 100e from a corresponding one of the energy storage devices 100a, 100b, . . . , 100e through WiFi communication.

Processor 520 controls the entire operation of the server 500. For example, the processor 520 may determine that each of the energy storage devices 100a, 100b, . . . , 100e will operate in the charge mode, based on at least one of the renewable power information, the commercial power information, the load power information and the additionally storable power information, received by the network interface 530, and calculate power to store in each of the energy storage devices 100a, 100b, . . . , 100e in the charge mode.

The processor 520 may also determine that each of the energy storage devices 100a, 100b, . . . , 100e will operate in the discharge mode, based on at least one of the renewable power information, the commercial power information, the load power information and the additionally storable power information, and calculate power to output from each of the energy storage devices 100a, 100b, . . . , 100e to the internal power network 50 in the discharge mode.

Storage unit 540 may store external Internet protocol (IP) addresses and internally allocated virtual IP addresses for provision of a wireless network, and radio channel names, frequency ranges, security information, etc. corresponding respectively to the virtual IP addresses. Also, the storage unit 540 may store device names, etc. of respective devices networked through the server 500.

Figure 12:
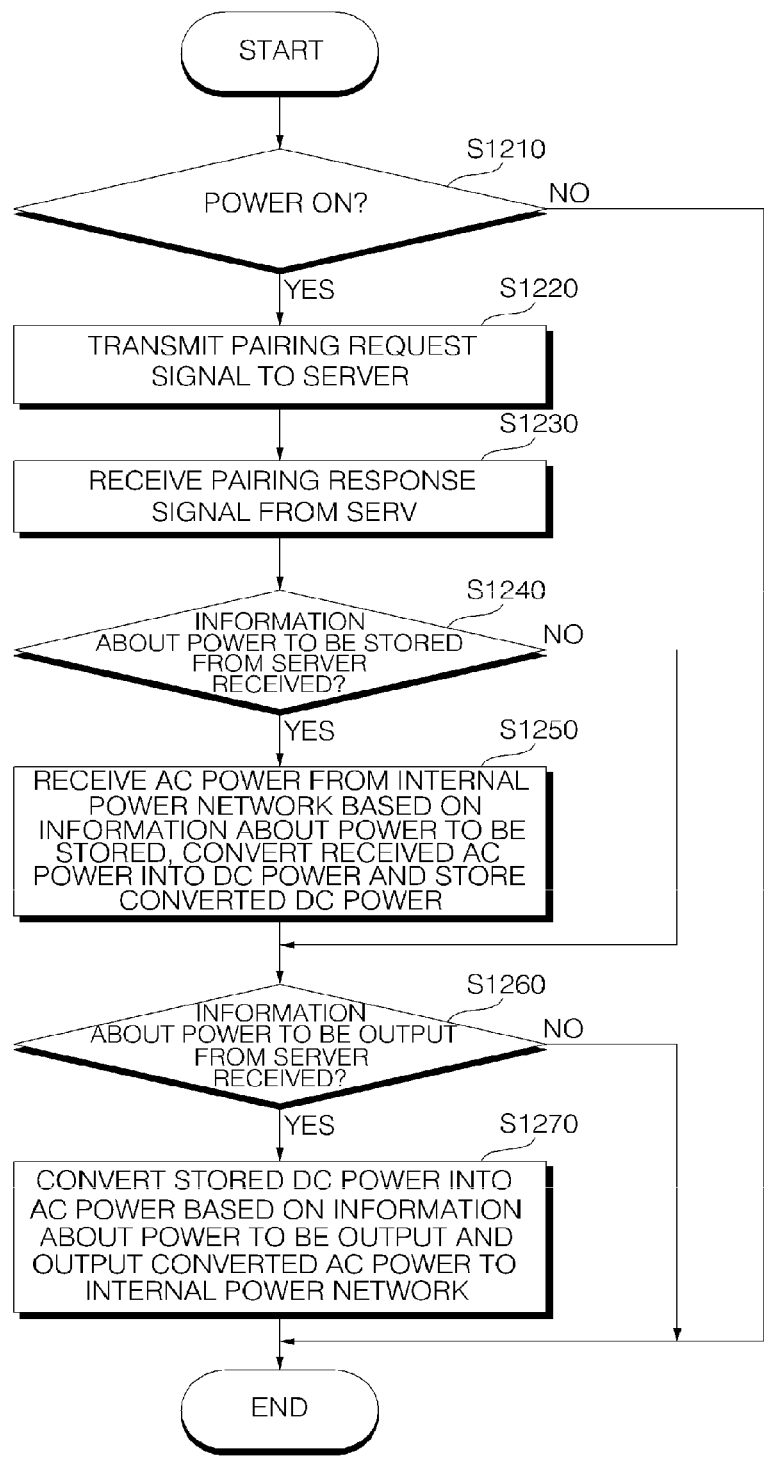
FIG. 12 illustrates a flowchart of a method for controlling an energy storage device according to an embodiment of the disclosure.
Figure 13:
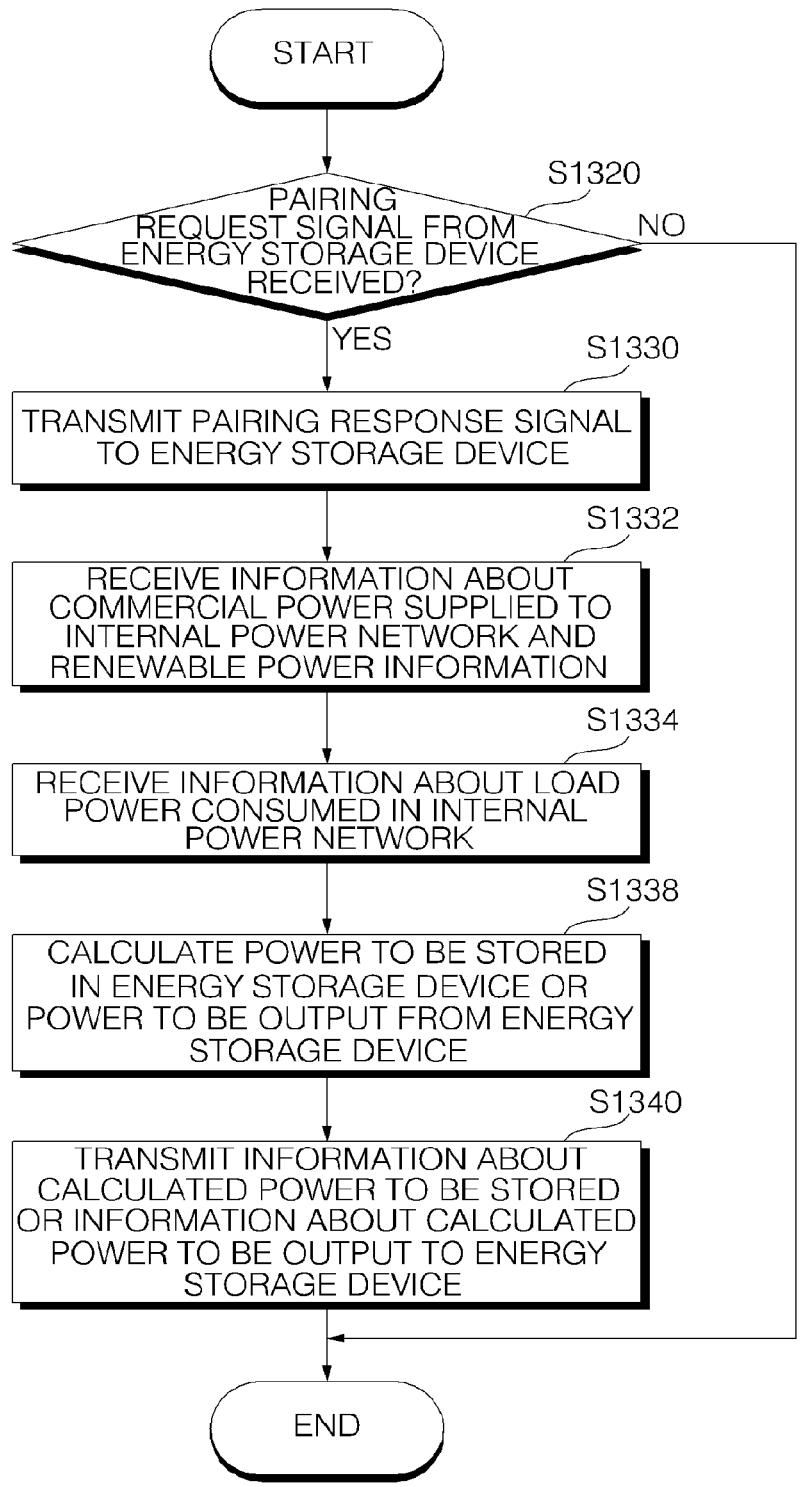
FIG. 13 illustrates a flowchart of a method for controlling a server, according to an embodiment of the disclosure.

FIG. 12 illustrates a flowchart of a method for controlling an energy storage device, FIG. 13 is a flowchart illustrating a method for controlling a server, and FIGS. 14, 15A-G, 16A-G, and 17A-B illustrate views referred to for description of the control methods of FIG. 12 or 13.

Referring to FIGS. 12-14, 15A-G, 16A-G, and 17A-B, the controller 320 of the energy storage device 100 determines whether the energy storage device 100 has been powered on (S1210). If the energy storage device 100 has been powered on, it transmits a pairing request signal to the server 500 (S1220). Then, the energy storage device 100 receives a pairing response signal from the server 500 (S1230).

Figure 15A:
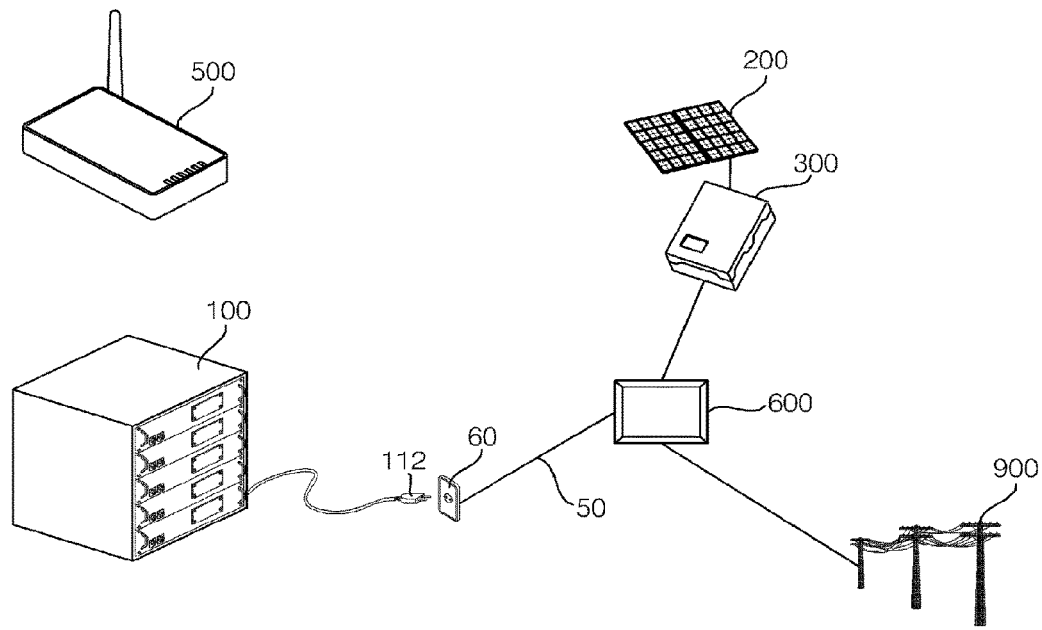

As shown in FIG. 15A, when a power plug 112 of the energy storage device 100 is connected to a power receptacle 60, the energy storage device 100 is electrically connected to the internal power network 50. In the energy storage device 100, AC power supplied from the internal power network 50 can be inputted through the first connector 305 and then converted into DC power by the power converter 310. The converted DC power may be supplied as operating power to each module of the energy storage device 100. As a result, when the operating power is input, the controller 320 may determine that the energy storage device 100 has been powered on, and then control the energy storage device 100 to transmit a pairing request signal indicating that the energy storage device 100 has been activated to the server 500 through the network interface 335.

Then, the server 500 determines whether the pairing request signal has been received (S1320), and transmits a pairing response signal to the corresponding energy storage device 100 upon determining that the pairing request signal has been received (S1330).

In the server 500, the network interface 530 transfers the pairing request signal received from the energy storage device 100 to the processor 520. Then, the processor 520 can generate a pairing response signal including information about a radio channel allocated to the corresponding energy storage device 100 in response to the pairing request signal, and then control the server 500 to transmit the generated pairing response signal to the energy storage device 100 through the network interface 530.

Figure 14:
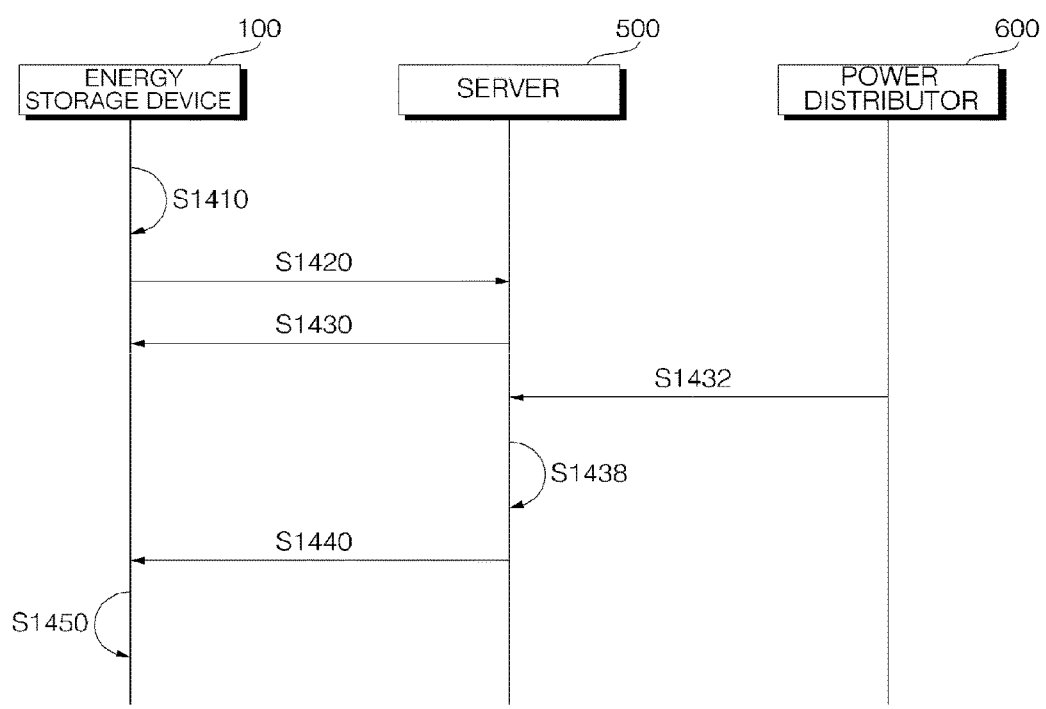
FIGS. 14, 15A-G, 16A-G, and 17A-B illustrate views referred to for description of the control methods of FIG. 12 or 13, according to an embodiment of the disclosure.
Figure 15B:
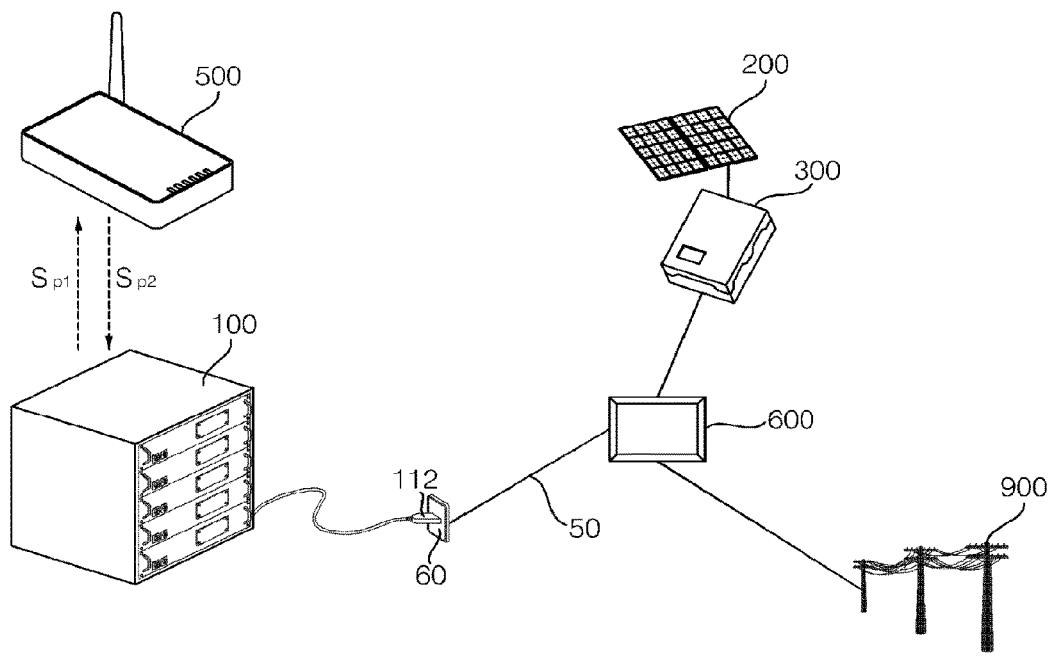

FIG. 15B illustrates that a pairing request signal Sp1 is transmitted from the energy storage device 100 to the server 500 and a pairing response signal Sp2 is transmitted from the server 500 to the energy storage device 100. Of note, step S1410 of FIG. 14 corresponds to step S1210 of FIG. 12, step S1420 of FIG. 14 corresponds to step S1220 of FIG. 12 and step S1320 of FIG. 13, and step S1430 of FIG. 14 corresponds to step S1230 of FIG. 12 and step S1330 of FIG. 13.

As illustrated in FIG. 13, subsequent to step S1330, server 500 may receive information about commercial power supplied to the internal power network 50 and renewable power information (S1332). Server 500 may then receive information about load power consumed in the internal power network 50 (S1334). The server 500 may then calculate power to store in the energy storage device 100 or power to output from the energy storage device 100 (S1338). Moving to block S1340, the server 500 may then transmit information about the calculated power to store or information about the calculated power to output to the energy storage device 100.

In some embodiments, server 500 may receive information about solar power generated by the photovoltaic module 200 or information about solar power converted by the junction box 300 through the network interface 530. This solar power information may be transmitted from the junction box 500 or power distributor 600 through WiFi communication. The network interface 530 of the server 500 may further receive commercial power information, load power information, and additionally storable power information. The commercial power information may be transmitted from the power distributor 600 through WiFi communication.

The load power information described herein may be transmitted from the power distributor 600. For example, provided that the power distributor 600 has a wattmeter which calculates the amount of power consumed in the internal power network 50, it will calculate load power through the wattmeter. Information about the load power calculated by the power distributor 600 may be transmitted to the server 500 through WiFi communication. Alternatively, load power may be calculated by a power calculator provided in each of the loads 700a, 700b, . . . , 700e, and information about the calculated load power may then be transmitted to the server 500 through WiFi communication. The server 500 may also receive information about power additionally storable in the battery pack 400 from the energy storage device 100 through WiFi communication.

Figure 15C:
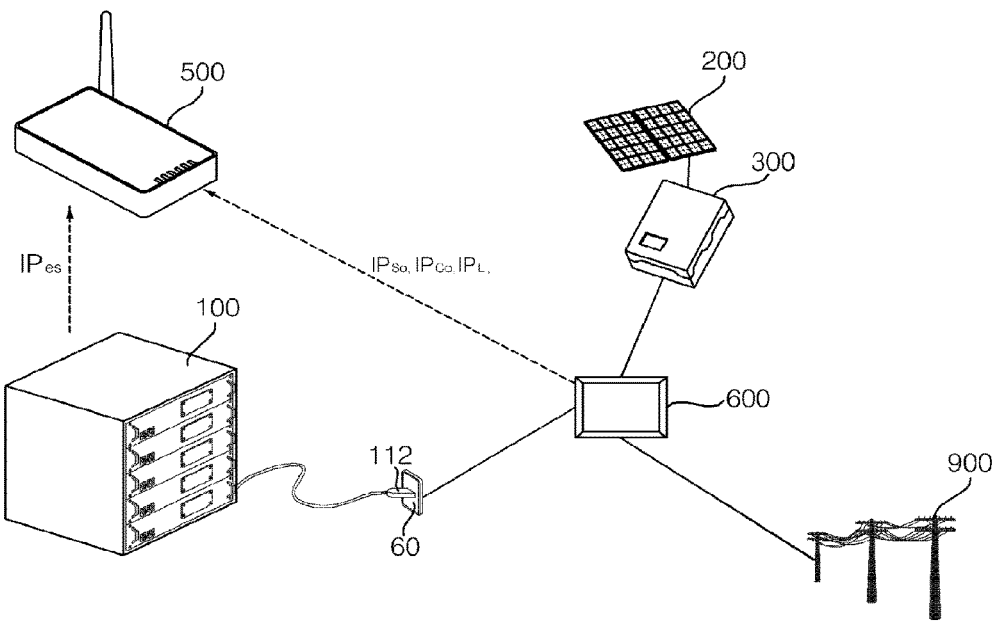

FIG. 15C illustrates additional power information that may be transmitted, stored, and utilized by the systems, devices, and methods disclosed herein. As shown, information IPes is transmitted from the energy storage device 100 to the server 500. In addition, the following information may be transmitted from the power distributor 600 to the server 500: information IPso about renewable power generated by the photovoltaic module 200, information IPco about commercial power supplied to the internal power network 50, and information $IP_L$ about load power consumed by each load.

With continued to reference to FIGS. 15C and 14, the processor 520 of the server 500 can determine whether each of the energy storage devices 100a, 100b, . . . , 100e will operate in the charge mode or discharge mode, based on at least one of the received renewable power information IPso, commercial power information IPco, load power information $IP_L$ and additionally storable power information IPes. If it is determined that each of the energy storage devices 100a, 100b, . . . , 100e will operate in the charge mode, the processor 520 of the server 500 may calculate power to store in each of the energy storage devices 100a, 100b, . . . , 100e. In addition, if it is determined that each of the energy storage devices 100a, 100b, . . . , 100e will operate in the discharge mode, the processor 520 may calculate power to output from each of the energy storage devices 100a, 100b, . . . , 100e to the internal power network 50.

The network interface 530 of the server 500 may transmit information about the calculated power to store to each of the energy storage devices 100a, 100b, . . . , 100e in the charge mode. Network interface 530 of the server 500 may also transmit information about the calculated power to output to each of the energy storage devices 100a, 100b, . . . , 100e in the discharge mode. The information about the power to store may include at least one of a charge start command and a charge stop command. In addition, the information about the power to output may include at least one of a discharge start command and a discharge stop command.

Of note, step S1432 of FIG. 14 corresponds to step S1332 of FIG. 13, step S1438 of FIG. 14 corresponds to step S1338 of FIG. 13, and step S1440 of FIG. 14 corresponds to step S1240 of FIG. 12 and step S1340 of FIG. 13.

Referring now to FIG. 12, the controller 320 of the energy storage device 100 determines whether information about power to store has been received from the server 500 (S1240). If the information about the power to store has been received from the server 500, the energy storage device 100 can receive AC power from the internal power network 50 based on the received information about the power to store, convert the received AC power into DC power, and store the converted DC power in the battery pack 400 (S1250).

Figure 15D:
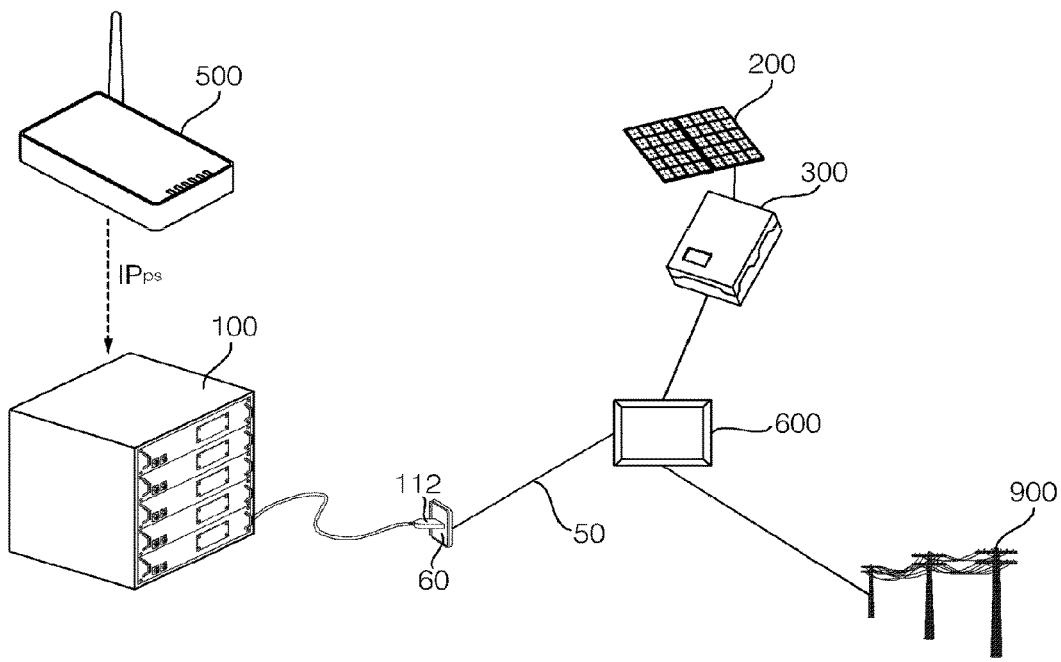

FIG. 15D illustrates the transmission of information IPps about power to store from the server 500 to the energy storage device 100. Upon receiving the information IPps about the power to store from the server 500, the network interface 335 of the energy storage device 100 can transfer the received information to the controller 320. Upon receiving the information IPps about the power to store from the network interface 335, the controller 320 may control the energy storage device 100 such that AC power corresponding to the power to store is input through the first connector 305 and then converted into DC power by the power converter 310. Then, the controller 320 may control the energy storage device 100 to store the converted DC power in the battery pack 400. Accordingly, the power corresponding to the information about the power to store may be stored in the battery pack 400.

Figure 15E:
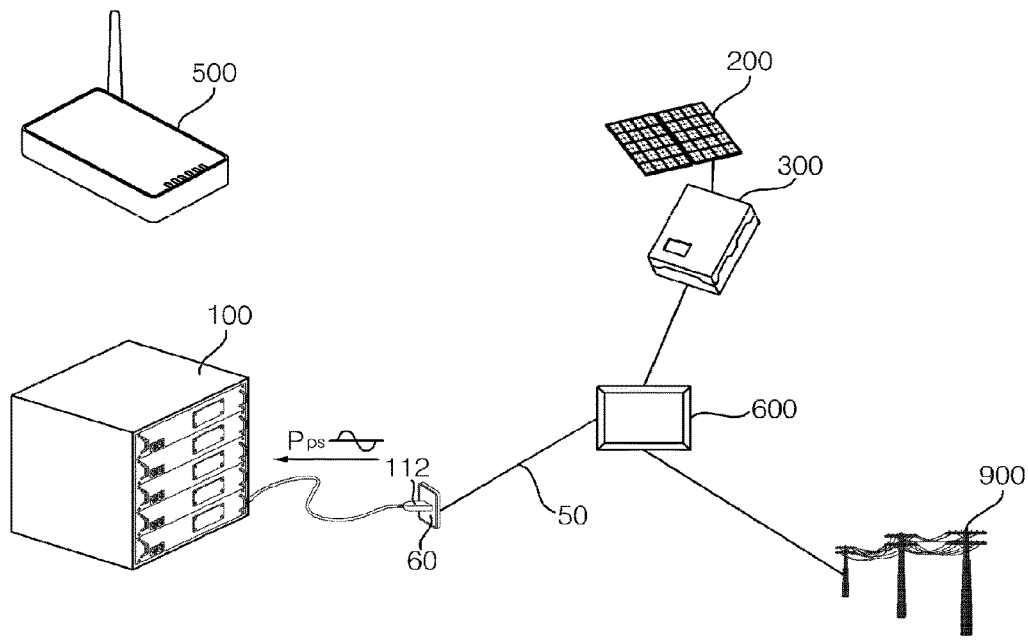

FIG. 15E illustrates that power Pps, namely AC power, corresponding to the information IPps about the power to store can be supplied from the internal power network 50 to the energy storage device 100. Of note, step S1450 of FIG. 14 corresponds to step S1250 of FIG. 12. As shown in FIG. 12, the controller 320 of the energy storage device 100 can determine whether information about power to output has been received from the server 500 (S1260). If the information about the power to output has been received from the server 500, the energy storage device 100 converts DC power stored therein into AC power based on the received information about the power to output and outputs the converted AC power to the internal power network 50 (S1270).

Figure 15F:
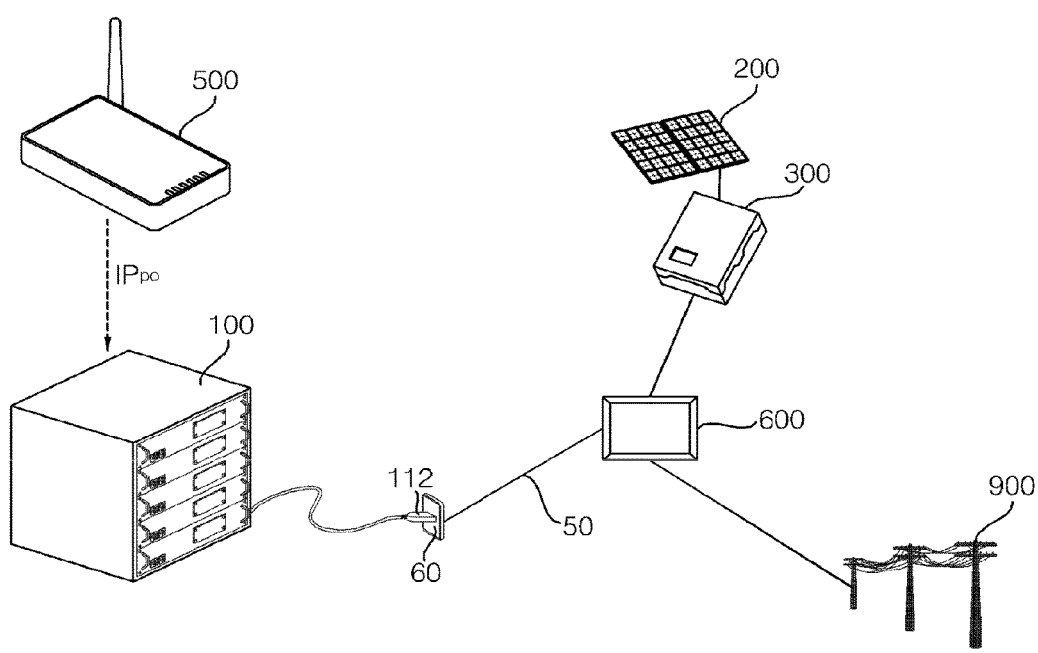

FIG. 15F illustrates that information IPpo about power to output can be transmitted from the server 500 to the energy storage device 100. Upon receiving the information IPpo about the power to output from the server 500, the network interface 335 of the energy storage device 100 transfers the received information to the controller 320. Upon receiving the information IPpo about the power to output from the network interface 335, the controller 320 may control the energy storage device 100 such that DC power stored in the battery pack 400 corresponding to the power to output is supplied to the power converter 310. Then, the controller 320 may control the energy storage device 100 such that the supplied DC power is converted into AC power by the power converter 310. Therefore, the DC power stored in the battery pack 400 may be converted and then supplied to the internal power network 50.

Figure 15G:
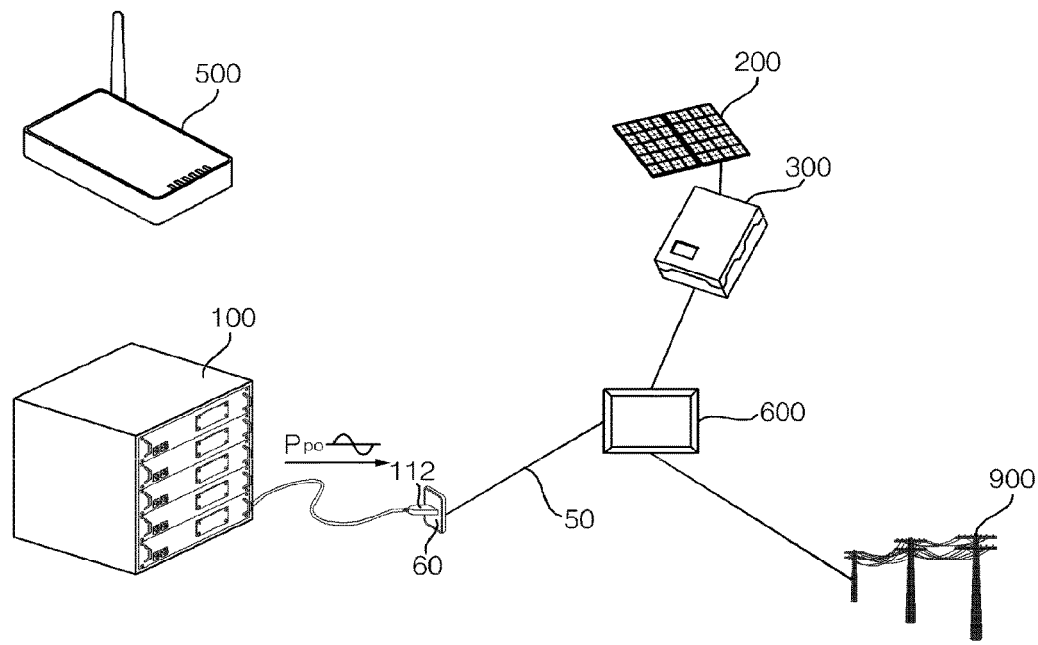

FIG. 15G illustrates that power Ppo, namely AC power, corresponding to the information IPpo about the power to output is supplied from the energy storage device 100 to the internal power network 50. Accordingly, power stored in the energy storage device 100 may be supplied to the internal power network 50, thereby reducing consumption of commercial AC power. That is, renewable energy, such as solar power from the photovoltaic module 200, is stored in the energy storage device 100 and then supplied to the internal power network 50, so that the energy may be efficiently consumed. In addition, because the consumption of the commercial AC power is reduced, the cost thereof is reduced.

In exemplary embodiments, whenever an energy storage device is added or removed, the server 500 may recognize the energy storage device addition or removal, receive information about the added or removed energy storage device and update the existing information with the received information. When the added energy storage device is powered on, the server 500 may perform pairing, etc. with the added energy storage device to newly store information about the added energy storage device, and allocate a radio channel for wireless data communication to the added energy storage device. Conversely, when an existing energy storage device is powered off, a radio channel in use is no longer being used. As a result, the server 500 may recognize that the existing energy storage device corresponding to the radio channel has been powered off, and update information about the powered-off energy storage device to free up the communication channel.

Server 500 may perform a control operation based on information about renewable power generated by the renewable energy generation device, information about commercial power supplied to the internal power network 50, information about load power consumed in the internal power network 50, etc. such that the commercial power is used at the minimum and the renewable power is used at the maximum. That is, the server 500 may provide corresponding information to the power distributor 600 such that all of the renewable power is supplied to the internal power network 50, and provide corresponding information to the power distributor 600 such that only a minimum amount of the commercial power is supplied to the internal power network 50 in consideration of the internal load power information.

The server 500 may provide a smart grid service. That is, in the case where the price of the commercial power is different according to time zones, the server 500 may perform a control operation such that the commercial power is supplied to the internal power network 50 at a time zone at which the commercial power is cheap. Also, the server 500 may perform a control operation such that the commercial power supplied to the internal power network 50 is stored in each energy storage device. For example, the server 500 may perform a control operation such that power stored in an energy storage device is supplied to the internal power network 50 at a time zone at which the commercial power is expensive. In some embodiments, commercial power price information may be transmitted to the server 500 through the power exchange 800 or power distributor 600.

Figure 16A:
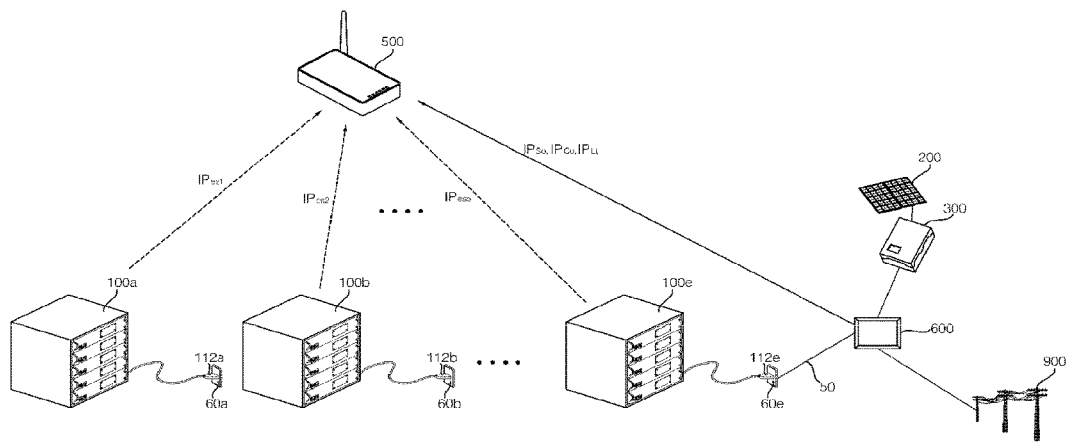

FIGS. 16A to 16E correspond to FIGS. 15C to 15G, respectively. In the illustrated embodiments, server 500 receives or transmits information from or to a plurality of energy storage devices. That is, FIG. 16A illustrates that additionally storable power information IPes1, IPes2, . . . , IPes5 may be transmitted from the respective energy storage devices 100a, 100b, . . . , 100e to the server 500. In the illustrated embodiments, FIG. 16A shows the transmission from the power distributor 600 to the server 500 of the following parameters: information IPso about renewable power generated by the photovoltaic module 200, information IPco about commercial power supplied to the internal power network 50 and information $IP_L$ about load power consumed by each load.

Figure 16B:
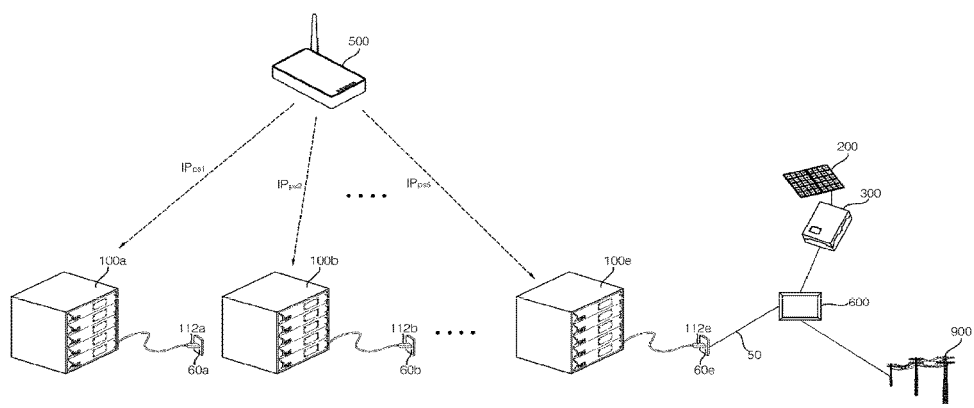

FIG. 16B illustrates that information IPps1, IPps2, . . . , IPps5 about powers to be stored can be transmitted from the server 500 to the respective energy storage devices 100a, 100b, . . . , 100e.

Figure 16C:
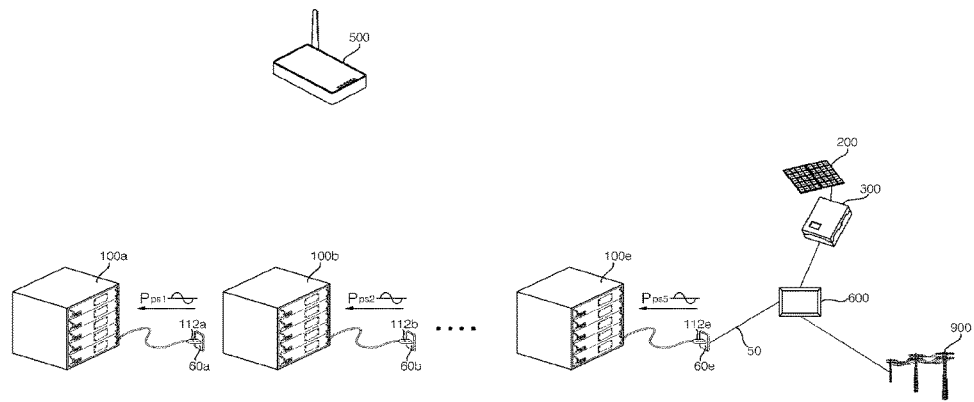

FIG. 16C illustrates that powers Pps1, Pps2, . . . , Pps5, namely AC powers, corresponding respectively to the information IPps1, IPps2, . . . , IPps5 about the powers to be stored can be supplied from the internal power network 50 to the respective energy storage devices 100a, 100b, . . . , 100e.

Figure 16D:
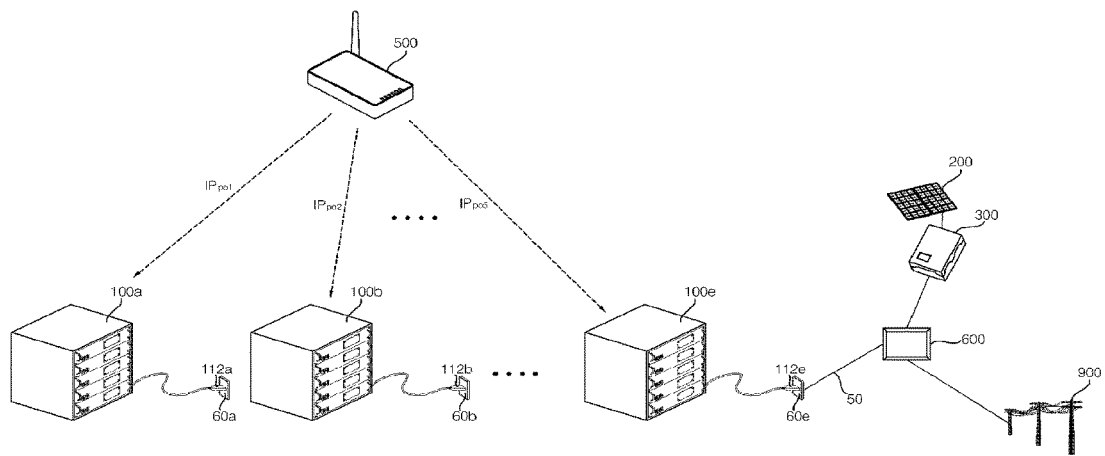

FIG. 16D illustrates that information IPpo1, IPpo2, . . . , IPpo5 about powers to be output can be transmitted from the server 500 to the respective energy storage devices 100a, 100b, . . . , 100e.

Figure 16E:
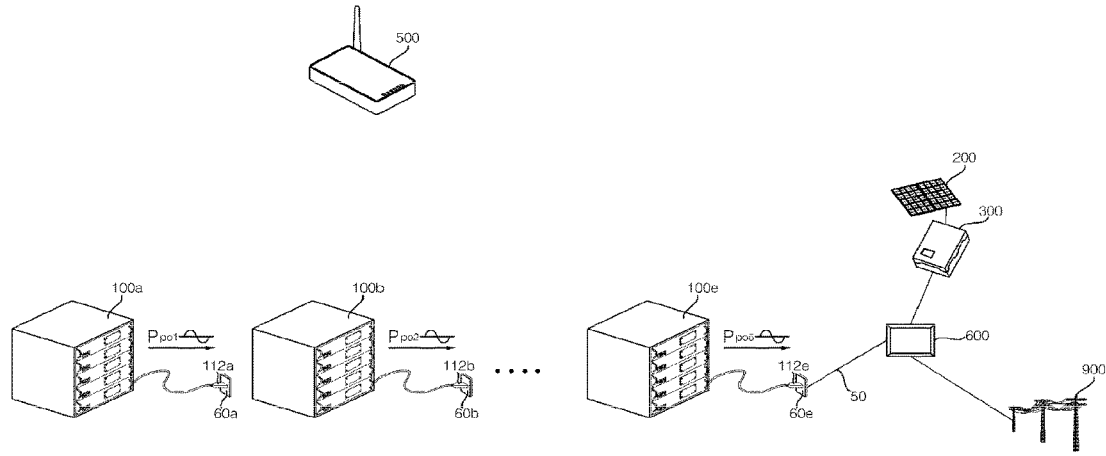

FIG. 16E illustrates that powers Ppo1, Ppo2, . . . , Ppo5, namely AC powers, corresponding respectively to the information IPpo1, IPpo2, . . . , IPpo5 about the powers to be output may be supplied from the respective energy storage devices 100a, 100b, . . . , 100e to the internal power network 50.

In an embodiment, all of the energy storage devices 100a, 100b, . . . , 100e may operate in the charge mode as shown in FIG. 16C or in the discharge mode as shown in FIG. 16E. Alternatively, some of the energy storage devices 100a, 100b, . . . , 100e may operate in the discharge mode and the others may operate in the charge mode.

Figure 16F:
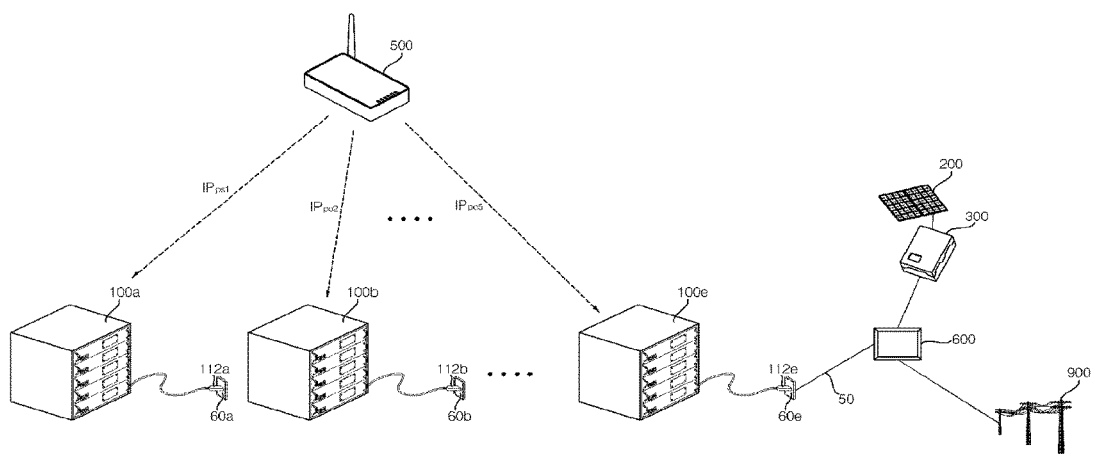

FIG. 16F illustrates the transmission from the server 500 to the respective energy storage devices 100a, 100b, . . . , 100e of information IPps1 about the power to store and the information IPpo1, IPpo2, . . . , IPpo5 about the powers to be output.

Figure 16G:
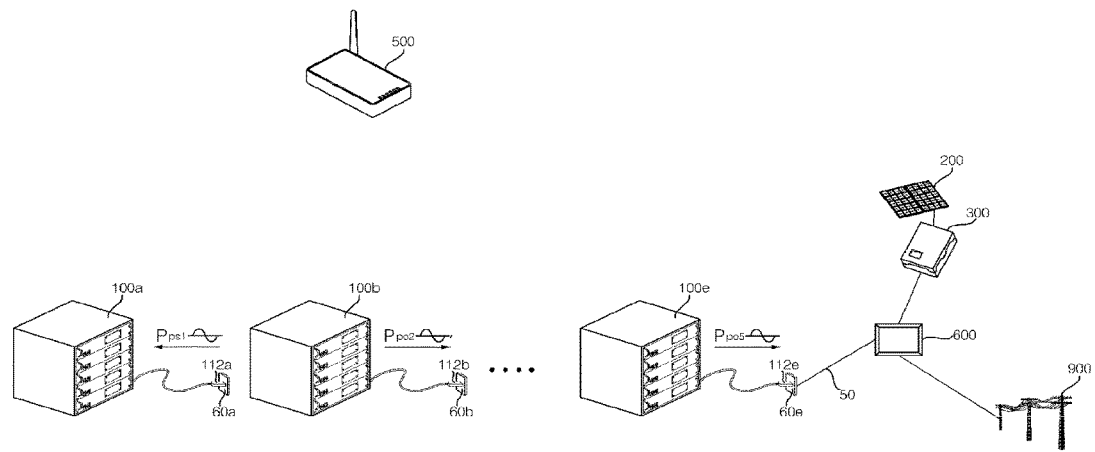

FIG. 16G illustrates supplying from the internal power network 50 to the first energy storage device 100a of the power Pps1, namely AC power, corresponding to the information IPps1 about the power to store. FIG. 16G illustrates that the powers Ppo2, . . . , Ppo5, namely AC powers, corresponding respectively to the information IPpo2, . . . , IPpo5 about the powers to be output can be supplied from the second to fifth energy storage devices 100a, 100b, . . . , 100e to the internal power network 50.

The power supply system 10 may supply some of the renewable power generated by the renewable energy generation device or some of the powers stored in the energy storage devices to the power exchange 800 through the power distributor 600. Accordingly, the processor 520 of the server 500 may calculate power to output to the outside of the internal power network 50 based on at least one of the load power information $IP_L$, the commercial power information IPco, the renewable power information Ipso and the information about the power stored in each energy storage device. That is, the processor 520 may calculate external output power to be transmitted to the power exchange 800.

Network interface 530 of server 500 may transmit information about the calculated external output power to power distributor 600, which distributes the commercial power to the internal power network 50. As a result, power distributor 600 can perform a control operation such that some of AC power supplied to the internal power network 50 is outputted externally, such as to the power exchange 800. Server 500 may perform a control operation such that some of the renewable power generated by the renewable energy generation device or some of the powers stored in the energy storage devices is supplied to the power exchange 800 through the power distributor 600 when there is a power transmission request from the power exchange 800 at a peak power consumption time zone.

Figure 17A:
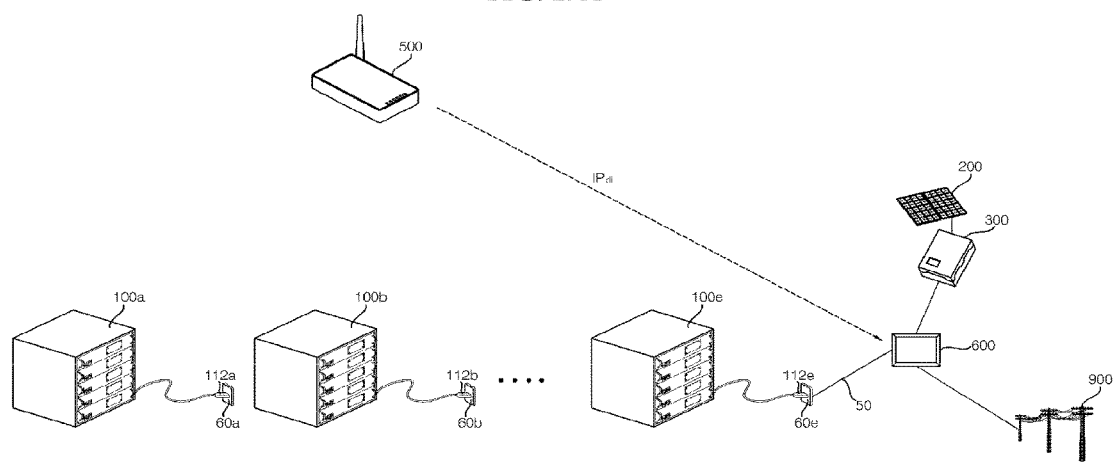

FIG. 17A illustrates that external output power information IPdi can be transmitted to the power distributor 600.

Figure 17B:
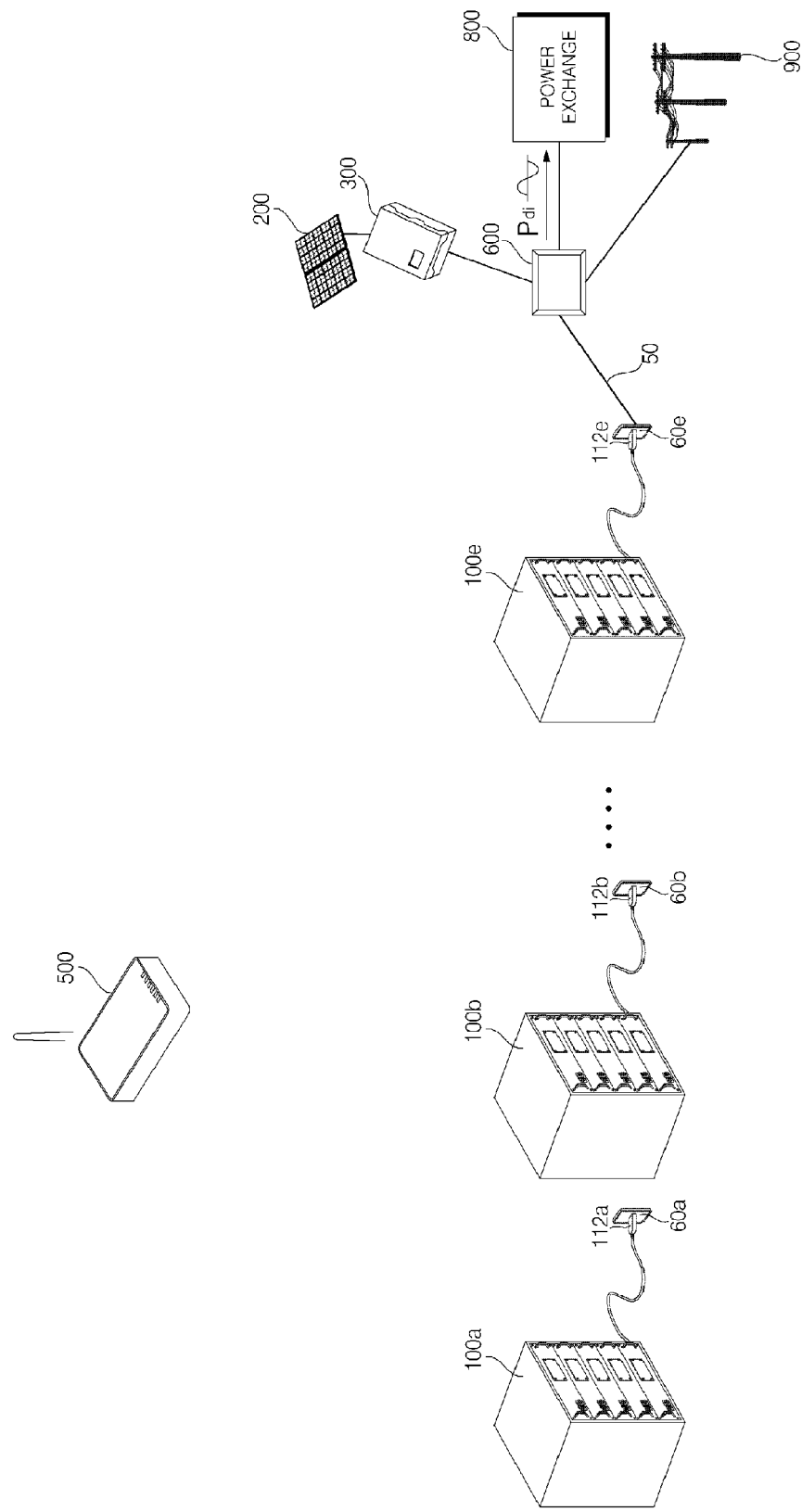

FIG. 17B illustrates that external output power Pdi, namely AC power, corresponding to the external output power information IPdi can be transmitted from the power distributor 600 to the power exchange 800. Accordingly, the disclosed devices, systems, servers, and methods effectuate more efficient use of power.

The plurality of energy storage devices 100a, 100b, . . . , 100e and the plurality of loads 700a, 700b, . . . , 700e in the power supply system 10 can have a one-to-one correspondence. Alternatively, a plurality of loads may be assigned to one energy storage device to correspond thereto. In particular, one energy storage device may correspond to loads adjacent thereto.

For example, one energy storage device may supply power stored therein to the internal power network 50 according to power consumption of a plurality of loads, and the corresponding loads may immediately consume AC power supplied from the energy storage device. That is, in the power supply system 10, an energy storage device corresponding to a local position where power consumption is required may operate in the discharge mode, thereby making it possible to efficiently manage power. The server 500 may store information about the position of each energy storage device, information about the position of each load, and information about power consumption of each load.

The information about the position of each energy storage device may be calculated based on the strength of a signal, etc. when pairing with the corresponding energy storage device is performed. Also, the information about the position of each load may be calculated based on the strength of a signal, etc. when pairing between the corresponding load and the server is performed.

The energy storage devices, servers, and methods for controlling the same are not limited to the configurations and methods of the above-described embodiments, and all or some of these embodiments may be selectively combined and configured so that those embodiments may be subjected to various modifications.

In addition, the energy storage device control method or server control method of the present invention may be implemented in a recording medium readable by the processor of the energy storage device or server by processor-readable codes. The processor-readable recording medium may include all types of recording units in which processor-readable data may be stored. For example, the processor-readable recording medium may include a ROM, a RAM, a CD-ROM, a magnetic tape, a floppy disk, an optical data storage, or the like. The processor-readable recording medium may also be implemented in the form of a carrier wave such as transmission over the Internet. Also, the processor-readable recording medium may be distributed to networked computer systems and processor-readable codes may be stored and executed in the computer systems in a distributed manner.

As is apparent from the above description, energy storage device may convert AC power from an internal power network into DC power and store the converted DC power, or convert DC power stored therein into AC power and output the converted AC power to the internal power network. This can be based on information about power to store or information about power to output, received from a server. Therefore, energy is more efficiently and easily stored in the energy storage device and control system.

For example, a power converter of the energy storage device may receive AC power and convert the received AC power into DC power, or convert DC power stored in a battery pack into AC power and output the converted AC power. As a result, the power converter may not require a separate DC/DC converter, allowing it to be more easily configured. In addition, when the energy storage device is powered on, it may perform pairing with the server to operate under control of the server, thereby increasing user convenience.

In an embodiment, when an energy storage device is powered on, the server may perform pairing with the powered-on energy storage device, thereby simplifying control of energy storage devices provided in the same internal power network. Server may allocate different radio channels to a plurality of energy storage devices, so as to efficiently control the respective energy storage devices.

The server may calculate power to store in at least one energy storage device through the internal power network or power to output from the energy storage device to the internal power network based on at least one of information about renewable power generated by a renewable energy generation device, information about commercial power supplied to the internal power network and information about load power consumed in the internal power network, and transmit information about the calculated power to store or information about the calculated power to be output to the energy storage device. Therefore, the server may efficiently control energy storage devices connected to the internal power network.

In addition, server may calculate power to be output to the outside of the internal power network based on at least one of the information about the renewable power generated by the renewable energy generation device, the information about the commercial power supplied to the internal power network and the information about the load power consumed in the internal power network, and transmit information about the calculated output power to a power distributor connected to the internal power network, so as to control the power distributor such that the corresponding power is externally output.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A server comprising:
    a network interface configured to receive information about renewable power generated by a renewable energy generation device, information about commercial power supplied to an internal power network and information about load power consumed in the internal power network;
    a processor to calculate power to store in at least one energy storage device through the internal power network or power to output from the energy storage device to the internal power network based on at least one of the load power information, the commercial power information and the renewable power information, to perform a control operation to allocate different radio channels to a plurality of energy storage devices; and
    a storage unit to store external Internet protocol (IP) addresses and internally IP addresses allocated to the plurality of energy storage devices,
    wherein a mobile terminal remotely accesses the server through at least one of the external Internet protocol (IP) addresses or outside network,
    wherein the network interface transmits information about the calculated power to store or information about the calculated power to output to the energy storage device.

2. The server according to claim 1, wherein the network interface receives a pairing request signal from the energy storage device and transmits a pairing response signal to the energy storage device.

3. The server according to claim 1, wherein the network interface receives information about power stored, storable or additionally storable in the energy storage device from the energy storage device.

4. The server according to claim 1, wherein:
    the network interface transmits the information about the calculated power to store or the information about the calculated power to output to each of the energy storage devices over a corresponding one of the different radio channels.

5. The server according to claim 1, wherein the network interface receives the information about the renewable power generated by the renewable energy generation device, the information about the commercial power supplied to the internal power network and the information about the load power consumed in the internal power network from a power distributor, the power distributor distributing the commercial power to the internal power network.

6. The server according to claim 1, wherein:
the processor calculates power to output to the outside of the internal power network based on at least one of the load power information, the commercial power information, the renewable power information and information about power stored in the energy storage device; and
the network interface transmits information about the calculated power to output to the outside of the internal power network to a power distributor, the power distributor distributing the commercial power to the internal power network.

7. The server according to claim 6, wherein:
the network interface exchanges data with the power distributor over a different radio channel with another energy storage device.

8. A method for controlling a server, the method comprising:
allocating different radio channels to a plurality of energy storage devices;
storing external Internet protocol (IP) addresses and internally IP addresses allocated to the plurality of energy storage devices;
receiving information about renewable power generated by a renewable energy generation device and information about commercial power supplied to an internal power network;
receiving information about load power consumed in the internal power network;
calculating power to store in an energy storage device through the internal power network or power to output from the energy storage device to the internal power network based on at least one of the load power information, the commercial power information and the renewable power information; and
transmitting information about the calculated power to store or information about the calculated power to output to the energy storage device,
wherein a mobile terminal remotely accesses the server through at least one of the external Internet protocol (IP) addresses or outside network.

9. The method according to claim 8, further comprising:
receiving a pairing request signal from the energy storage device; and
transmitting a pairing response signal to the energy storage device.

10. The method according to claim 8, further comprising:
receiving information about power stored, storable or additionally storable in the energy storage device from the energy storage device.

11. The method according to claim 8, further comprising:
allocating different radio channels to a plurality of energy storage devices,
wherein the transmitting comprises transmitting the information about the calculated power to store or the information about the calculated power to output to each of the energy storage devices over a corresponding one of the different radio channels.

12. The server according to claim 1, wherein the at least one of the plurality of the energy storage devices are added or removed, the processor is configured to recognize the energy storage device addition or removal, to receive information about the added or removed energy storage device and to update existing information with the received information.

13. The server according to claim 2, wherein whenever the energy storage device is powered on, the processor is configured to perform pairing.

14. The server according to claim 2, wherein when the energy storage device is powered off, the processor is configured to free up communication channel corresponding to the powered off energy storage device, and to update information about the powered-off energy storage device.

* * * * *